United States Patent [19]

Levine

[11] Patent Number: 4,554,635
[45] Date of Patent: Nov. 19, 1985

[54] METHOD AND APPARATUS FOR MARKING OR CUTTING LAMINAR PATTERNS OR FORMS

[75] Inventor: Richard W. Levine, Dobbs Ferry, N.Y.

[73] Assignee: Construction Technology, Inc., Dobbs Ferry, N.Y.

[21] Appl. No.: 503,699

[22] Filed: Jun. 13, 1983

Related U.S. Application Data

[63] Continuation-in-part of Ser. No. 402,607, Jul. 28, 1982, abandoned.

[51] Int. Cl.$^4$ .............................................. G06F 15/46
[52] U.S. Cl. ...................................... 364/475; 83/32; 83/71; 364/148; 364/191; 364/512
[58] Field of Search ............... 364/474, 475, 505, 512, 364/130, 400, 148, 171, 191, 192, 193; 83/32, 71, 374, 451, 925 CC; 269/8

[56] References Cited

U.S. PATENT DOCUMENTS

| | | | |
|---|---|---|---|
| 3,477,322 | 11/1969 | Gerber et al. | 83/71 |
| 3,596,068 | 7/1971 | Doyle | 235/150 |
| 3,610,081 | 10/1971 | Gerber | 83/62 |
| 3,761,675 | 9/1973 | Mason et al. | 219/121 |
| 3,803,960 | 4/1974 | Pearl et al. | 83/71 X |
| 3,843,875 | 10/1974 | Goodstal et al. | 235/151 |
| 3,875,389 | 4/1975 | McFadden et al. | 235/151 |
| 4,152,765 | 5/1979 | Weber | 364/191 X |
| 4,178,820 | 12/1979 | Gerber | 83/13 |
| 4,327,615 | 5/1982 | Gerber et al. | 83/49 |
| 4,362,077 | 12/1982 | Gerber | 269/8 X |
| 4,373,412 | 2/1983 | Gerber et al. | 83/451 X |

Primary Examiner—Joseph Ruggiero
Attorney, Agent, or Firm—Kenyon & Kenyon

[57] ABSTRACT

The present invention relates to a method and apparatus for creating, laying out and cutting patterns on laminar sheet material having particular application to air handling ducting which permits the fully automated creation of the patterns required to subsequently construct three-dimensional products such as fittings, which have heretofore only been designed by skilled technicians. Information representative of the geometric configurations of a group of basic pattern types, including mathematical relationships, is stored in digital form in a memory. From the basic pattern types, substantially all variations of the three-dimensional product can be developed. An operator specifies the type of fitting required and inputs selected actual basic dimensions of the product, the basic dimensions being those dimensions necessary to specify the overall dimensions of the product. The patterns for the closed sides of the product are developed from the mathematical relationships specifying the geometry of the basic pattern types in response to the input basic dimensions. The patterns so developed are then computed for optimum positioning with other developed patterns, most preferably with alignment of similarly shaped edges for sheet material optimization, and preferably with adjacent grouping of the patterns for each end product to facilitate location and assembly and, most preferably, in such a manner that each grouping can be severed from the sheet material with a single cut to facilitate use of sheet or coil stock shearing machinery.

51 Claims, 38 Drawing Figures

COMBINATION OF DOUBLES

COMBINATION OF AB WITH SINGLE C & D

THIS RESULTS IN THE SELECTION OF AN OPTIMUM POSITION

METHOD AND APPARATUS FOR MARKING OR CUTTING LAMINAR PATTERNS OR FORMS

FIELD OF THE INVENTION

This is a continuation-in-part of U.S. application Ser. No. 402,607, filed July 28, 1982, abandoned.

This invention relates to a method and an apparatus for creating, laying out on and cutting patterns from laminar sheets of material and, in particular, relates to a method and apparatus which is of particular utility in the sheet metal working arts where custom patterns are required for fittings or other parts on a job-by-job basis and where the production run extends to a single set of patterns or to a relatively small number of sets of specially configured patterns.

While not limited thereto, the present invention finds particular application in the manufacture of duct work, such as air conditioning ducting, fresh-air or exhaust air ducting, or in ducting employed for conveying fluidized particulate materials.

Any suitable laminar material may be employed in the practice of the present invention, such as, for example, metal sheeting, such as a galvanized iron sheeting, or iron sheeting which has been otherwise coated to render it resistant to rusting and corrosion. Copper or aluminum sheeting, and other sheet materials, such as fiberglass sheeting and the like have also been found to be particularly suitable.

Broadly, the present invention is directed to an improvement in the sheet metal arts which is uniquely suitable to circumstances where mass-production is not economically feasible or, where mass-production although feasible, first requires the design of templates or masters of the patterns.

In the air conditioning and ventilation industries the ducting is designed to the specific dimensions of an architectural structure either under construction, renovation or improvement, and the ducts must be tailored or custom designed for each project, particularly since the ducts generally must occupy the residual space and not encroach on the space required for plumbing and electrical lines.

Compared to other manufacturing requirements of the construction industry, duct fabrication is unique in that it still employs one piece at a time custom pattern development and manually controlled cutout of the development patterns. In the space allocated for installation, such as the hung ceiling space in office buildings, the plumbing, sprinkler systems, steam fittings, electrical conduits and air conditioning ducts must all inter-fit and be coordinated to conjointly occupy the available space.

The plumbing lines, sprinkler lines, and steam lines must be arranged in uninterrupted planes, or otherwise drainage of water therefrom is precluded. The size and location of electrical conduits is mandated by the wiring requirements and the pragmatic prohibition which does not permit it to be bent more than a few times or it becomes impossible to pull the wires through the conduits in the usual manner.

In constrast, air ducting can be arranged to extend about and around the work of others. This inter-fitting of the ducting around the other, generally straight-line, structures can be achieved by raising, lowering, changing the direction of or modifying the cross sectional dimensions of the ducting. There is, therefore, a requirement for three-dimensional customized fittings between straight sections of ducting.

Architects and engineers have taken full advantage of the ability to modify ducting location to maximize usable space. Their designs provide relatively complex spatial allocation for duct work, even though the consequent need for non-standard fittings results in costly customizing of ducts. Economically, it has been determined that it is a far better choice to have ten floors of rentable space in a 100-foot high building by employing intricately arranged ducting, instead of eight floors of space with less complex ducting. The initial relatively high installation cost is greatly compensated for by the resultant gain in rentable space.

This extremely high use of non-standard fittings, which must be produced one piece at a time, has prevented the application of automation techniques from significantly impacting the ducting industry. By and large, the fittings are produced by the age-old process of having a highly skilled artisan determine what components are required to create the three-dimensional fitting from flat sheet stock. Each component piece (generally four patterns adapted to interfit) must then be marked out on the sheet metal. The marking out, in addition to being time consuming and laborious, requires the skill of a sheet metal layout technician for laying out the pattern on sheet material.

By and large, little or no attempt is made to optimize material usage and, in fact, the layout is generally a one piece at a time operation. Little time is spent assessing optimum stock widths, positioning of patterns and minimizing severing lines.

Since the sheet metal layout technician must mark out the outline of the four patterns by hand, these four patterns, together, forming the fitting, significant compromises are made as, for example, in not maximizing material usage.

In the late 1950's, a machine called a Coil Line Duct Maker became available. It permitted automation of the manufacture of standard straight duct sections. This machine, now standard shop equipment for virtually all major duct fabricators, permits mass-production of standard straight duct sections and has become the common manner of manufacture.

This has exacerbated the problem attendant upon the tedious and time consuming steps required for the production of the non-standard fittings which now have become the paramount limiting and cost factor in the production capability of duct work fabricators.

It is commonly known in the industry that each hour's output of shop fabrication supports about two hours of field installation work, i.e., every hour gained in shop productivity generates two hours of new work opportunity in field installation.

It would thus seem obvious that fabricators seek to train and employ more layout technicians, but this has not been possible and there presently exists a worldwide shortage of layout technicians. A 1975 survey of the Northeast United States reported that the then average age of a layout technician was 55 years. Although layout technicians represent only 4 to 5 percent of total industry employees, the shortage of technicians has directly accounted for a reduction in the work opportunity for the entire industry.

Some have suggested means for the possible automation of at least part of the layout technician's function, but none were truly beneficial as none could provide a means to create the initial patterns for the components of the fittings which meets the requirements hereinabove set forth.

For example, the use of an electrically driven and controlled marking table has been proposed in the manufacture of patterns, such a marking table being controlled by a scanning arrangement which enables the scaling up of the sets of patterns from reduced scale drawings of those patterns, such drawings commonly being to quarter scale.

However, this technology has, heretofore, not been employed in the ducting fabrication industry because all the layout technician receives is a rough sketch dimension layout of the particular customized piece required, from which the technician must, on a customized basis, create the patterns on the sheet material.

While, heretofore the automation of the production of patterns for nonstandard duct work fittings has been considered as being totally impractical or impossible, considerable attention has been given in other industries to the production of patterns, particularly in the clothing industry, in which extensive developments have been made in automating the cutting of fabric panels for subsequent assembly into garments.

Typical of such applications are U.S. Pat. Nos. 4,327,615 to Gerber et al, issued May 4, 1982; 4,178,820 to Gerber, issued Dec. 18, 1979; 3,610,081 to Gerber, issued Oct. 5, 1971; and 3,477,322 to Gerber et al, issued Nov. 11, 1969, which teach the use of a computer-controlled cutter which is employed to sever layers of material secured to the bed of a cutting table, the cutter being moved under the control of the computer simultaneously in first and second directions longitudinally and laterally of the table along X and Y axes.

Such an operation, however, still involves the initial drawing of the respective patterns to full or reduced scale by a skilled layout draftsman, who must also maximize utilization of the material, after which the drawing is scanned to convert the information contained thereon into digital signals which are stored and subsequently used to control movement of the cutter. Despite the accuracy with which the drawings are prepared, any errors can appear at the cutting head, and can reappear in amplified form in the event that movement of the cutter is scaled up from reduced scale drawings.

Sophistication of the electronics industries, made possible by the availability of computers, has permitted the elimination of repetitive hand drafting but the original drawings must still be created by hand. Electronic scanning now permits the development of the patterns on a cathode ray tube. The storage, in memory, of those patterns in the form of digital information, can then be subsequently recovered and utilized to control the cutter head. This system has the advantage of permitting corrections to be made of any errors which occur in the developed pattern, but do not solve the problem of creating the initial patterns. This still requires the skill of a technician.

For example, U.S. Pat. No. 3,596,068 to Doyle, issued July 27, 1971, recognizes the disadvantage of manually laying out patterns to maximize material usage and proposes converting manually developed patterns to digital signals and the subsequent comparison of the digitized information, including rotation of the stored pattern information, to optimize material usage. Similarly, U.S. Pat. No. 3,875,389 to McFadden et al., issued April 1, 1975, discloses a system the object of which is to optimize a single pattern to permit its production in quantity by interfitting facsimiles of that pattern and rotating the assemblage until maximized material usage is achieved. Both of these teachings still require a separate hand drawing for each pattern to be produced as the basis for digitization, comparison and pattern rotation.

Once the patterns have been established and laid out, automated methods for cutting have been suggested. Again, and more particularly as related to the clothing industry, it is recognized in U.S. Pat. No. 3,761,675 to Mason et al, issued Sept. 25, 1973, that the cutting of fabric is feasible using a laser beam as a cutter.

However, these advances found little applicability in the duct work fabricating industry. Creation of the master pattern was still subject to the individual skill of an artisan and, lacking mass production needs, automation was conceived of as being economically impractical.

THE INVENTIVE CONCEPT

According to the present invention, each of the operations, heretofore requiring the judgment and skill of the technician, are fully automated, including the initial determination of the number and size of pattern required for each nonstandardized fitting; the placement of the patterns or pattern on the sheet material, both optimizing material usage and cutting patterns; and, in its most preferred form, to scribe or mark out; tag and, if desired, cut out the pattern or patterns for ready assembly.

Basically, the present invention affords a method and an apparatus for creating patterns for a three-dimensional product which can then be fabricated from patterns of laminar sheet material, the method including the steps of:

electronically creating, through mathematical calculation, the shape (or pattern) of a selected portion of the end product on the basis of dimensional information;

electronically creating, through mathematical calculation, the others of the shapes of the portion of the end product;

positioning all the shapes required for such end product in a grouping such that the grouping when aligned on said sheet material may be severed from the sheet material by a single substantially straight cut across the sheet material;

positioning selected pairs of shapes in said grouping with like edge configurations in relative juxtaposition;

rotating said pairs of shapes to yield a juxtaposition which provides for optimum material usage and for severance of the shapes with a minimum of cutting steps; and converting the shape into physical form onto a sheet of planar material.

In accordance with the present invention, microprocessing and plotting equipment under the control of an algorithm program performs all the steps required without the intervention on the part of the operator other than the supplying of information which identifies the basic type of the fitting, and its dimensional parameters.

Preferably, the invention comprises a method for producing the customized patterns of the closed sides of a three dimensional product which can be fabricated from sheet material, such as a ventilating duct fitting, comprising the steps of:

storing, in digital form in memory means, the configurations of a group of basic pattern types having nominal dimensions from which substantially all variations of the product can be developed;

entering input data including the actual dimensions of the patterns to be formed and the pattern type;

generating, from the actual dimensional and pattern type data, the pattern of each side of the product, each of the patterns developed from selected ones of the basic pattern types in response to the input dimensional and pattern type data;

positioning the developed patterns in a series of groupings;

determining which of the groupings yields the minimum surface area so as to provide for optimum material usage and generating digital data representing the optimum grouping;

supplying the digital data representing the optimum grouping to an X-Y plotting table, the data being in block format and including digital data representing the starting point for each pattern in X-Y format and sequential digital data in X-Y format representing the contour of each pattern; and plotting the patterns in accordance with the digital data on a sheet of material on the plotting table.

In preferred embodiments, the apparatus and method comtemplate means to evaluate, and to optimize usage on the basis of the likely stock sizes of sheet material available to the fabricator and to automatically suggest the stock which will result in the least waste.

If desired, the program can include such additional features as the fabrication of configurations which exceed the maximum width size of the sheet stock by computing combinations of pieces. Further, in accordance with the present invention, printed records for all patterns in inventory for possible recall may be maintained. The present invention is not only capable of designing nonstandard fitting patterns but in addition, includes, within the pattern configuration, modifications which adapt the patterns to the tooling of the fabricator so as to optimize the assembly process.

These benefits and others which will be apparent to one skilled in the art, have been made possible by the discovery that all shapes and dimensions of patterns employed in the duct work industry may be expressed in terms of a small number of geometric shapes which may be three but is preferably four, which can be modified on the basis of predetermined equations to the shape and dimension of a component of the desired fitting, the program or algorithm being employable to produce any required permutation or combination of the basic geometric figures. When provided with the desired dimensions of the fitting, the program algorithm of the present invention enables a complete set of patterns to be automatically produced, including sets of patterns for ducts having bends, dual or multiple bends of any required radius and radial extent, including bends which decrease or increase in radial width and with simultaneous increase or decrease in axial width, and any combination of such bends with rectilinear portions of converging or diverging construction, any of such fitting sections terminating in either right or offset ends. The four geometric figures can be expressed as an annular segment of a circle; dual interconnected annular segments of circles taken about centers of generation which are spaced from each other; a rhomboid, and a trapezoid. The latter two configurations, i.e., the rhomboid and the trapezoid, may be expressed as a single shape as each can be developed from the same configuration through modification of dimensions. However, in order to utilize a predetermined set of algorithms, it is desirable to treat the rhomboid and trapezoid separately.

Further, after having been provided with the required dimensions and number of patterns, the algorithm preferably rotates and orients the forms with respect to each other to yield, on the basis of the stock sheet material being employed, a grouping which aligns all patterns required for a fitting such that a single width wide cut of the sheet will yield a sheet with all the required patterns for a single fitting and additionally maximizes the sheet material usage and provides optimization of the cutting steps in severing the patterns from the sheet stock.

Having finalized calculations on the basis of the algorithm and the specific dimensions of the set of patterns to be produced, the entire process of fabrication of the respective patterns can be effected automatically, by computer-generated sets of patterns fed to a computer controlled layout plotting table and, in its most preferred form by providing a laser means for severance of the patterns.

Ancillary to the cutting of the patterns or the marking thereof for subsequent cutting is the capability of the algorithm of the present invention to produce a complete inventory of the sets of patterns, a costing thereof, and the location thereof within the ducting system with such information being delivered for subsequent use as hard copy by means of a conventional print-out device.

While the present invention is able to develop sets of patterns for any desired shape or dimension of fitting based upon these geometrically expressed figures, it should be understood that the number of patterns required to create a three-dimensional rectilinear fitting need not be comprised of four separate patterns. In some instances, the fitting would be comprised of only two patterns each of which is subsequently bent to provide the four sides of the fitting or one of which is subsequently bent to provide three sides of the fitting.

As will be readily understood, proceeding from a planar square, any desired geometric variation therefrom can be obtained by varying the length of one side to zero or by modifying the angle between adjacent sides. Similarly, any combination of curves can be produced by modifying the radius and arcuate extent of an annular segment, and by adding thereto one or more segments of the same or differing dimensions, either in juxtaposition with each other or in juxtaposition with a rectilinear section. All of these variations are within the capability of the present invention, including simultaneous combination of rectilinear and arcuate segments to produce non-arcuate curvilinear segments.

While the sizes and lengths of duct fittings are infinite in number and in variation, in rectangular duct construction there are basically four general types of fittings within the industry. There are transition fittings, which are fittings between ducts of differing outer perimeter dimensions; offset fittings, in which ducts of the same perimeter lying along parallel planes are sought to be connected; elbow fittings, which are fittings for right angle turns; and bevel fittings which are fittings for turns other than ninety degrees.

In accordance with the present invention, once the type of fitting is identified and the dimensional information provided, the optimum construction type in accordance with approved industry standards will be calculated. The algorithms of the present invention mathematically create the shapes for each of the four sides required for the fitting type and provide the most efficient method of laying out the requisite patterns. The results may indicate the desirability of a two piece construction, three piece construction or four piece construction.

Irrespective of the complexity of the fitting the shape of the fitting sought to be designed is generated on the basis of one of the mathematically expressed geometric shapes, i.e., an annular segment of a circle, dual interconnected annular segments of circles taken about centers of generation which are spaced from each other; a rhomboid, and a trapezoid.

Having established the dimensions of the four sides of the fitting, the algorithm of the present invention through sequential rotation and positional orientation of the mathematically expressed dimensional representations of the patterns stored in the memory of the microprocessor, which also carries within its memory the basic mathematical geometric configurations, then positions the configurations A, B, C, and D, which represent the four sides of the fitting, with respect to each other on the basis of the following, in which "X" indicates the positioning of the forms in one direction along a first axis and "Y" indicates the positioning of the forms along another axis, the suffix "r" indicates the rotation of the particular form through ninety degrees, the suffix "1" indicating the forms are tried in a single position, and the suffix "1:2" indicating the forms are tried in mirror image and inverted mirror image:

| | |
|---|---|
| Position 1: | X = A1, B1, C1; Y = B1, D1. |
| Position 2: | X = A1, B1, C1r; Y = B1, D1. |
| Position 3: | X = A1, B1, C1; Y = B1, D1r. |
| Position 4: | X = A1, B1, C1r; Y = B1, D1r. |
| Position 5: | X = A1, B1, D1; Y = B1, C1. |
| Position 6: | X = A1, B1, D1r; Y = B1, C1. |
| Position 7: | X = A1, B1, D1; Y = B1, C1r. |
| Position 8: | X = A1, B1, D1r; Y = B1, C1r. |
| Position 9: | X = A1:2, B1:2 + C1:2, D1:2; Y = A1:2, C1:2 + B1:2, D1:2. |
| Position 10: | X = A1, B1 +C1r, D1r; Y = A1, C1r + B1, D1r. |
| Position 11: | X = A1, B1 + C1r, D1; Y = A1, C1r + B1, D1. |
| Position 12: | X = A1, B1 + C1, D1r; Y = A1, C1 + B1, D1r. |
| Position 13: | X = A1, B1 + D1 + C1; Y = A1 + B1, D1, C1. |
| Position 14: | X = A1, B1, + D1 + C1r; Y = A1 + B1, D1, C1r. |
| Position 15: | X = A1, B1 + D1r + C1; Y = A1 + B1, D1r, C1. |
| Position 16: | X = A1:2, B1:2 + D1:2r + C1:2r; Y = A1:2 + B1:2, D1:2r, C1:2r. |
| Position 17: | X = A1, B1, D1 & C1; Y = A1 + B1 + D1, C1. |
| Position 18: | X = A1, B1, D1r & C1; Y = A1 + B1 + D1r, C1. |
| Position 19: | X = A1, B1, D1r + C1r; Y = A1 + B1 + D1r, C1r. |
| Position 20: | X = A1, B1, D1 + C1r; Y = A1 + B1 + D1, C1r. |
| Position 21: | X = A1:2, B1:2, C1:2, D1:2; Y = A1:2 + B1:2 + C1:2 + D1:2. |
| Position 22: | X = A1, B1, C1R, D1; Y = A1 + B1 + C1R + D1. |
| Position 23: | X = A1, B1, C1, D1r; Y = A1 + B1 + C1 + D1r. |
| Position 24: | X = A1, B1, C1r, D1r; Y = A1 + B1 + C1r + D1r. |
| Position 25: | X = B1r + A1r, C1 + D1; Y = B1r, A1r, D1 + C. |
| Position 26: | X = B1r + A1r, C1r + D1; Y = B1r, A1r, D1 + C1r. |
| Position 27: | X = B1r + A1r, C1 + D1r; Y = B1r, A1r, D1r + C1. |
| Position 28: | X = B1r, A1r, C1r + D1r; Y = B1r, A1r, D1r + C1r. |
| Position 29: | X = B1r + A1r, D1 +C1; Y = B1r, A1r, C1 + D1. |
| Position 30: | X = B1r + A1r, D1r, C1; Y = B1r, A1r, C1 + D1r. |
| Position 31: | X = B1r + A1r, D1 + C1r; Y = B1r, A1r, C1r + D1. |
| Position 32: | X = B1r + A1r, D1r + C1r; Y = B1r, A!r, C1r + D1r. |
| Position 33: | X = B1:2r + A1:2r + C1:2, D1:2; Y = B1:2r, A1:2 r, C1:2 + D1:2. |
| Position 34: | X = B1r + A1r + C1r, D1r; Y = B1r, A1r, C1r + D1r. |
| Position 35: | X = B1r + A1r + C1r, D1; Y = B1r, A1r, C1r + D1. |
| Position 36: | X = B1r + A1r + C1, D1r; Y = B1r, A1r, C1 + D1r. |
| Position 37: | X = B1r + A1r + D1 + C1; Y = B1r, A1r, D1, C1. |
| Position 38: | X = B1r + A1r + D1 + C1r; Y = B1r, A1r, D1, C1r. |
| Position 39: | X = B1r + A1r + D1r + C1; Y = B1r, A1r, D1r, C1. |
| Position 40: | X = B1:2r + A1:2r + D1:2r + C1:2r; Y = B1:2r, A1:2r, D1:2r, C1:2r. |
| Position 41: | X = B1r, D1 + A1r, C1; Y = B1r, A1r + D1, C1. |
| Position 42: | X = B1r, D1r + A1r, C1; Y = B1r, A1r + D1r, C1. |
| Position 43: | X = B1:2r, D1:2r + A1:2r, C1:2r; Y = B1:2r, A1:2r + D1:2r, C1:2r. |
| Position 44: | X = B1r, D1 + A1r, C; Y = B1r, A1r + D1, C1r. |
| Position 45: | X = B1:2r +I A1:2r, C1:2, D1:2; Y = B1:2r, A1:2r + C1:2 + D1:2. |
| Position 46: | X = B1r + A1r, C1r, D1; Y = B1r, A1r + C1r + D1. |
| Position 47: | X = B1r + A1r, C1, D1r; Y = B1r, A1r + C1 + D1r. |
| Position 48: | X = B1r + A1r, C1r, D1r; Y = B1r, A1r + C1r + D1r. |
| Position 49: | X = A1r, B1r, C1 + D1; Y = A1r + B1r, D1 + C1. |
| Position 50: | X = A1r, B1r, C1r + D1; Y = A1r + B1r, D1 + C1r. |
| Position 51: | X = A1r, B1r, C1 + D1r; Y = A1r + B1r, D1r + C1. |
| Position 52: | X = A1r, B1r, C1r + D1r; Y = A1r + B1r, D1r + C1r. |
| Position 53: | X = A1r, B1r, D1 + C1; Y = A1r + B1r, C1 + D1. |
| Position 54: | X = A1r, B1r, D1r + C1; Y = A1r + B1r, C1 + D1r. |
| Position 55: | X = A1r, B1r, D1 + C1r; Y = A1r + B1r, C1r + D1. |
| Position 56: | X = A1r, B1r, D1r + C1r; Y = A1r + B1r, C1r + D1r. |
| Position 57: | X = A1:2r, B1:2r + C1:2, D1:2; Y = A1:2r, C1:2 + B1:2r, D1:2. |
| Position 58: | X = A1r, B1r + C1r, D1r; Y = A1r, C1r + B1r, D1r. |
| Position 59: | X = A1r, B1r + C1r, D1; Y = A1r, C1r + B1r, D1. |
| Position 60: | X = A1r, B1r + C1, D1r; Y = A1r, C1 + B1r, D1r. |
| Position 61: | X = A1r, B1r + D1 + C1; Y = A1r, B1r, D1, C1. |
| Position 62: | X = A1r, B1r + D1 + C1r; Y = A1r + B1r, D1, C1r. |
| Position 63: | X = A1r, B1r + D1r + C1; Y = A1r + B1r, D1r, C1. |
| Position 64: | X = A1r, B1r + D1r + C1r; Y = A1r + B1r, D1r, C1r. |
| Position 65: | X = A1r, B1r, D1 + C1; |

|  |  |
|---|---|
|  | Y = A1r + B1r + D1, C1. |
| Position 66: | X = A1r, B1r, D1r + C1;<br>Y = A1r + B1r + D1r, C1. |
| Position 67: | X = A1:2r, B1:2r, D1:2r, C1:2r;<br>Y = A1:2r + B1:2r + D1:2r, C1:2r. |
| Position 68: | X = A1r, B1r, D1 + C1r;<br>Y = A1r + B1r + D1, C1r. |
| Position 69: | X = A1:2r, B1:2r, C1:2, D1:2;<br>Y = A1:2r + B1:2r + C1:2 + D1:2. |
| Position 70: | X = A1r, B1r, C1r, D1;<br>Y = A1r + B1r + C1r + D1. |
| Position 71: | X = A1r, B1r, C1, D1r;<br>Y = A1r + B1r + C1 + D1r. |
| Position 72: | X = A1r, B1r, C1r, D1r;<br>Y = A1r + B1r + C1r + D1r. |
| Position 73: | X = A1 + B1, C1 + D1;<br>Y = A1, B1, D1 + C1. |
| Position 74: | X = A1 + B1, C1r + D1;<br>Y = A1, B1, D1 + C1r. |
| Position 75: | X = A1 + B1, C1 + D1r;<br>Y = A1, B1, D1r + C1. |
| Position 76: | X = A1, C1r + B1 + D1r;<br>Y = A1, B1, D1r + C1r. |
| Position 77: | X = A1 + B1, D1 + C1;<br>Y = A1, B1, C1 + D1. |
| Position 78: | X = A1 + B1, D1r + C1;<br>Y = A1, B1, C1 + D1r. |
| Position 79: | X = A1 + B1, D1 + C1r;<br>Y = A1, B1, C1r + D1. |
| Position 80: | X = A1 + B1, D1r + C1r;<br>Y = A1, B1, C1r + D1r. |
| Position 81: | X = A1:2 + B1:2 + C1:2, D1:2;<br>Y = A1:2, B1:2, C1:2 + D1:2. |
| Position 82: | X = A1 + B1 + C1r, D1r;<br>Y = A1, B1, C1r + D1r. |
| Position 83: | X = A1 + B1 + C1r, D1;<br>Y = A1, B1, C1r + D1. |
| Position 84: | X = A1 + B1 + C1, D1r;<br>Y = A1, B1, C1 + D1r. |
| Position 85: | X = A1 + B1 + D1 + C1;<br>Y = A1, B1, D1, C1. |
| Position 86: | X = A1 + B1 + D1 + C1r;<br>Y = A1, B1, D1, C1r. |
| Position 87: | X = A1 + B1 + D1r + C1;<br>Y = A1, B1, D1r, C1. |
| Position 88 | X = A1:2 + B1:2 + D1:2r + C1:2r;<br>Y = A1:2, B1:2, D1:2r, C1:2r. |
| Position 89: | X = A1, D1 + B1, C1;<br>Y = A1, B1 + D1, C1. |
| Position 90: | X = A1, D1r + D1, C1;<br>Y = A1, B1 + D1r, C1. |
| Position 91: | X = A1:2, D1:2r + B1:2, C1:2r;<br>Y = A1:2, B1:2 + D1:2r, C1:2r. |
| Position 92: | X = A1, D1 + B1, C1r;<br>Y = A1, B1 + D1, C1r. |
| Position 93: | X = A1:2, C1:2, D1:2 + B1:2;<br>Y = A1:2, B1:2 + C1:2 + D1:2. |
| Position 94: | X = A1, C1r, D1 + B1;<br>Y = A1, B1 + C1r + D1. |
| Position 95: | X = A1, C1, D1r + B1;<br>Y = A1, B1 + C1 + D1r. |
| Position 96: | X = A1 + B1, C1r, D1r;<br>Y = A1, B1 + C1r + D1r. |

The symbol "+" above indicates that the forms are tried in more than one row or column in the direction indicated. For example, Position 9 indicates that forms A and B are positioned next to each other in the X direction; Forms C and D are then also positioned next to each other in the X direction. The Y direction indicates that Forms A and C are positioned next to each other in the Y direction and that forms B and D are likewise positioned next to each other in the Y direction. Accordingly, the forms are tried in the arrangement

AC
BD if X indicates the vertical axis and Y indicates the horizontal axis (see Table below). Position 9 also indicates the forms A, B, C and D are arranged in mirror image and inverted mirror image. This method of arranging the forms will become clearer in the more detailed description below with reference to the drawings and the Table.

In addition, the following extra positions permit the mathematical positioning of dimensional representations E, which are larger in at least one dimension than the sheet stock available, so as to require more than a single sheet to produce a side of a particular pattern, on the basis of the following additional positions:

| Position 97: | X = E1, E1 + C1, D1;<br>Y = E1, C1 + E1, D1. |
|---|---|
| Position 98: | X = E1, E1 + C1r, D1r;<br>Y = E1, C1r + E1, D1r. |
| Position 99: | X = E1, E1 + C1, D1r;<br>Y = E1, C1 + E1, D1r. |
| Position 100: | X = E1, E1 + C1r, D1;<br>Y = E1, C1r + E1, D1. |
| Position 101 | X = E1:2, E1:2, C1:2, D1:2;<br>Y = E1:2 + E1:2 + C1:2 + D1:2. |
| Position 102: | X = E1, E1, C1r, D1;<br>Y = E1 + E1 + C1r + D1. |
| Position 103: | X = E1, E1, C1r, D1r;<br>Y = E1 + E1 + C1r + D1r. |
| Position 104: | X = E1, E1, C1, D1r;<br>Y = E1 + E1 + C1 + D1r. |

The above positions represent the essential positional combinations which will yield a group of patterns for a fitting which can be severed from a sheet by a single cut across the sheet and in which the patterns are laid out for minimum waste of material and optimum severance.

A microprocessor performs the mathematical calculations with the microprocessor having stored in its memory the basic geometric configurations and a program for implementing the mathematical positioning.

Preferably, the computer-generated patterns and other data developed and stored in the microprocessor are converted to a form, such as a paper tape which may be used to actuate automated plotting equipment, which automatically marks out physical representations on planar sheeting by selective traversing of its plotting head along predetermined axes under the control of independently driven motors.

In its most preferred form the method and apparatus of the present invention further includes integral means on the plotting aparatus which is responsive to the information provided by the microprocessor for cutting the patterns by the use of a laser.

The present invention thus describes a method and apparatus for automatically producing the data required for laminar patterns and the production of the patterns by a mechanically driven plotting apparatus which marks-out or carries along the cutting tools for severance of the patterns on a sheet of material positioned on the plotting bed of the plotting apparatus.

Preferably, the plotting apparatus includes a plotting head supported for independent movement parallel to the plotting bed along preferably mutually perpendicular X and Y axes, the plotting head being driven selectively along the respective X and Y axes by dual independently driven motors under the control of a microprocessor and wherein the microprocessor has stored within its memory at least one basic geometric configuration of at least one of a plurality of laminar patterns of an interrelated series of such patterns. Once the microprocessor is provided with information relative to the required ultimate dimensions of the pattern, it correlates the dimensions of the pattern to the dimensions of other complementary patterns which are required to form a series of interrelated patterns which, when interfit, will create a fitting. Furthermore, through selective rotation and positioning of the series of patterns to orient the dimensional representations of the series of the patterns as stored in the microprocessor, the apparatus determines representations of the series of the patterns which results in the smallest required surface area of at least a portion of a sheet material of stock dimensions, considering the optimum desirable cutting lines between the patterns and the requirement that patterns of a fitting be grouped such that the group can be severed by a single, preferably widthwide cut. The data thus developed and stored in the microprocessor is thereafter used to control the drive motors of the plotter to mark out or sever physical representations of the patterns on the sheet of material.

BRIEF DESCRIPTION OF THE DRAWINGS

The present invention will be described in greater detail in the following detailed description with reference to the drawings, in which:

FIGS. 3-1-3-15 are schematic representation of the transition, offset, elbow and bevel fitting types in accordance with the present invention.

FIGS. 5-11 are schematic representations illustrating the method by which the present invention calculates the optimum positioning of patterns to minimize material usage and optimize cutting.

FIG. 12 is a schematic representation of two of the various mathematical positions in which the microprocessor tries the patterns to determine optimal positioning for laying out and cutting the patterns.

FIG. 13 illustrates, in perspective view, a typical fitting.

FIG. 14 illustrates the prior art method of ordering and laying out the fitting of FIG. 13.

FIG. 15 illustrates the same fitting as illustrated in FIG. 13 as developed and layed out in accordance with the present invention.

DESCRIPTION OF THE PREFERRED EMBODIMENTS

Figure 1:
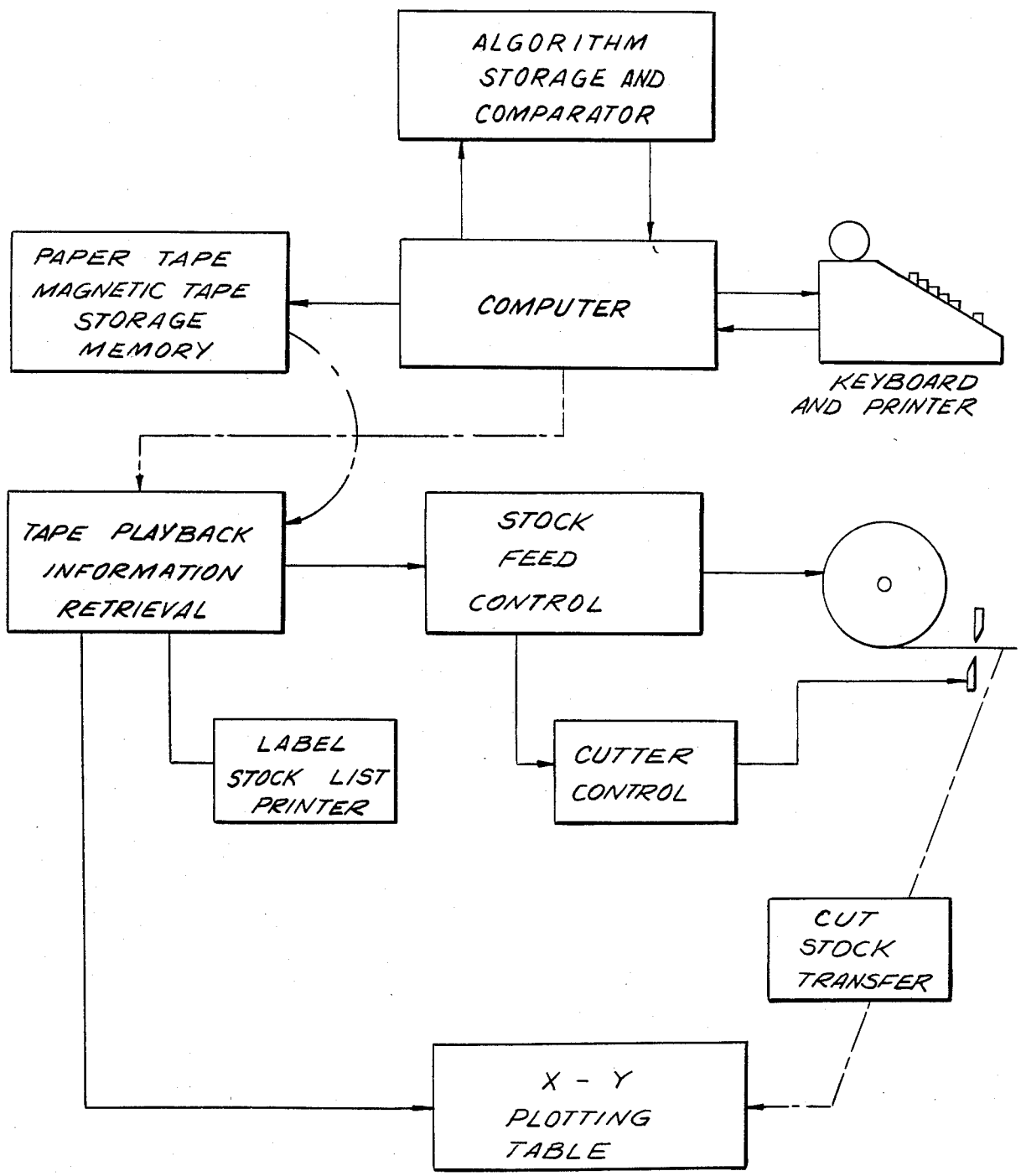
FIG. 1 is a block diagram of an apparatus for plotting out and marking patterns of a fitting according to the present invention.

FIG. 1 illustrates the general means for the retention of information, generation of data, and the production of plotted out patterns on sheet metal stock in accordance with the present invention. The algorithm storage and comparator drive for the computer can be selected from any readily available commercial equipment. Preferably a computer system is employed which includes a display, magnetic tape, disk or other storage and a keyboard to permit inputting of information. It is preferable that at least 32K of random access memory capability to included within the system.

The system shown in FIG. 1 includes memory 10 wherein the preferred program for implementing the optimization listing described above is stored. The preferred optimization program must be stored in random access computer memory because of the speed with which the optimization must be done. Storage on disks would be too slow to implement the program efficiently. Disk storage, however, might, of course, be used to store the computer operating system program. Should limitations of computer hardware (e.g., insufficient random access memory) preclude the preferred optimization described above, other less sophisticated optimization procedures such as the outside rectangle technique to be described later, could be used, with the accompanying reduction in memory requirements. Furthermore, memory 10 should be non-volatile, so that the contents are not lost if the system is powered down. For example, magnetic core storage can be used or a battery back-up provided for enabling orderly shut down of the system and storage on permanent media (disk or tape) after a power down.

Computer 20 is coupled to I/O devices 30 which preferably include a keyboard, printer and CRT display. Once the fitting type and dimensional data are inputted into the system via the keyboard, the computer 20 will determine which orientation of the duct pattern sides is optimum, preferably in accordance with the optimization program described above, and will output the data which determines orientation of the pattern in X-Y format to an output device 40, such as a paper tape punch or magnetic tape unit. The magnetic tape unit may also be used for back-up protection in the event of a power failure.

The paper or magnetic tape bearing the output data can later be read by an appropriate playback and information retrieval device 50, such as a paper-tape reader or magnetic tape unit. Alternatively, data from computer 20 may also be fed electronically to the X-Y plotting table 103 instead of utilizing the intermediate paper or magnetic tape medium. Paper tape, however, provides a convenient means for storing the data indefinitely prior to use on the shop floor. This data controls metal stock feed control 70 and cutter control 80, which controls coil feed 90 and cutter 95, which might comprise a flying shear cutter, for example. The cut sheet metal stock is then transferred, preferably by a conveyor 110, to an X-Y plotting table 103, also controlled by information retrieval device 50. At the X-Y plotting device, the sheet metal stock is either marked with the patterns for a particular duct fitting or the patterns are directly cut, preferably by a laser cutting device, to be described below.

While the data generated by the computer could be inputted directly to the plotting table, it is preferable that the data be converted to a storage form such as magnetic tape, paper tape or other memory medium for later use, as described.

Upon the inputting of a command for calling up from storage memory 10 a particular stored fitting layout or any number of layouts up to and including the total number required for a given shipment such as when using tape playback information retrieval equipment, the information can then be provided to the automated plotting table which will plot on X and Y axes as hereinafter more particularly described, the pattern or patterns.

It has been found particularly convenient to employ a paper tape output for the computer and a paper tape reader to control the plotting table.

It has also been found particularly desirable, where the fabricator has automated equipment for the feeding of the sheet material, to directly control the sheet metal feed to the plotting table by the microprocessor 20. This permits the feeding out of the sheet material to the plotting table and placing indicia on the sheet for cutting of the sheet into segments after the plotting of the patterns of a particular fitting. While any known means may be employed for feeding the sheet stock, transferring it to the plotting table and cutting it, it is particularly desirable if the equipment includes a tape reader compatible with the tape reader which controls the plotting table.

In its preferred form, the tape playback information retrieval apparatus, preferably, also includes a label stock list printer 60 which prints the labels for each of the patterns and identifies those common to a given fitting. As hereinbefore set forth, the preferred program or algorithm of the present invention maintains all components of each fitting piece in adjoining relationship so as to ensure that all patterns of a fitting can preferably be separated from the patterns of other fittings with a straight cut cross the width of the sheet stock. This feature not only provides a benefit in instances where on-site separation of the patterns from the sheet stock and fabrication is desirable but also provides benefits to fabricators who cut out the patterns immediately and assemble the fitting so that they can be delivered to the job site in finished form.

Figure 2:
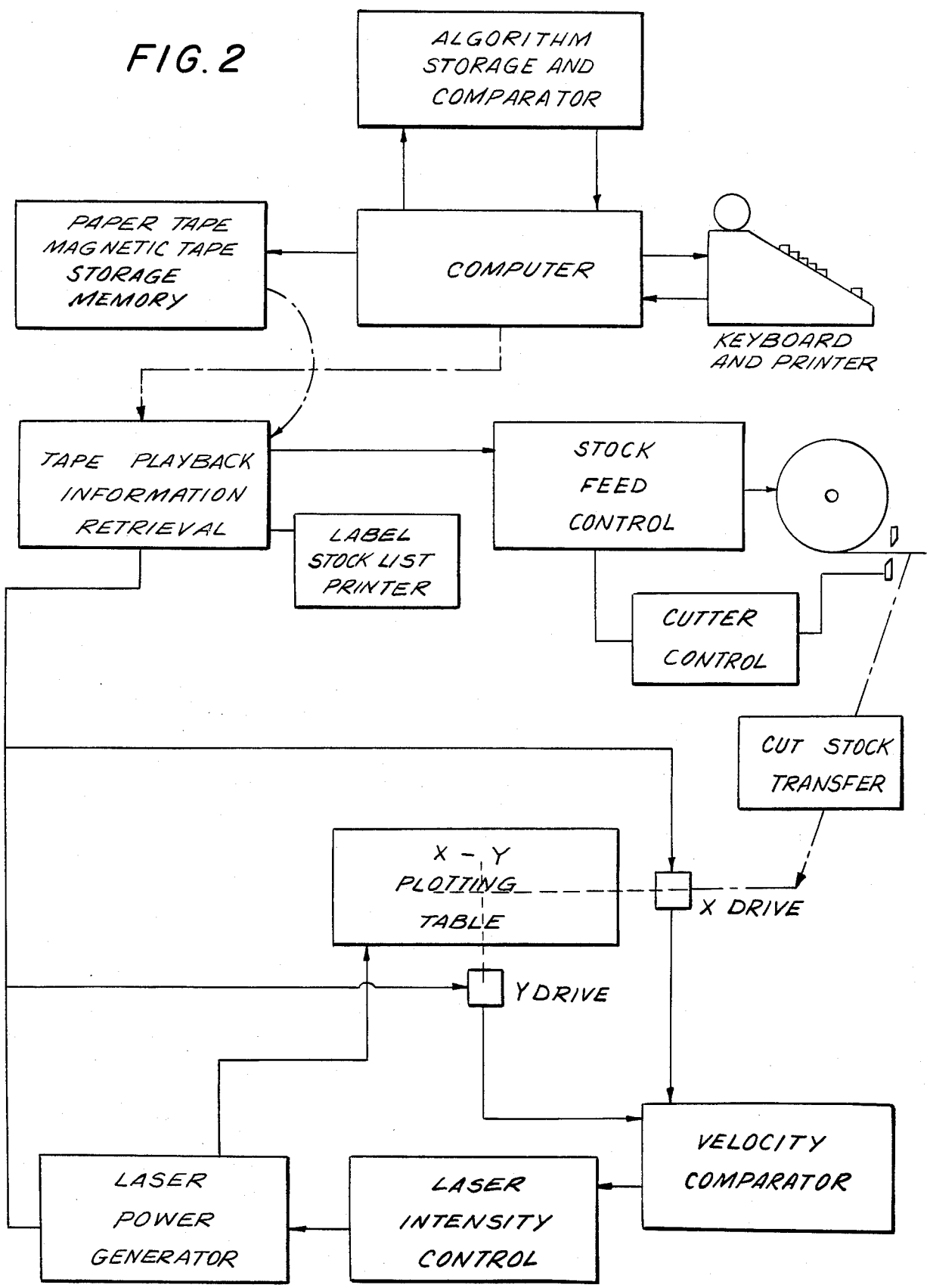
FIG. 2 is a block diagram of an alternate form of the present invention further including a laser cutting apparatus.

FIG. 2 illustrates a preferred form of the invention which further includes automated equipment to cut out the patterns on the plotting table through the use of a laser. Like components are indicated with the same reference numerals as used in FIG. 1. The embodiment shown in FIG. 2 further comprises Y motor drive controller 122, X motor drive controller 124, velocity comparator 150, laser cutter power generator 130 and laser cutter intensity control 140.

Figure 17:
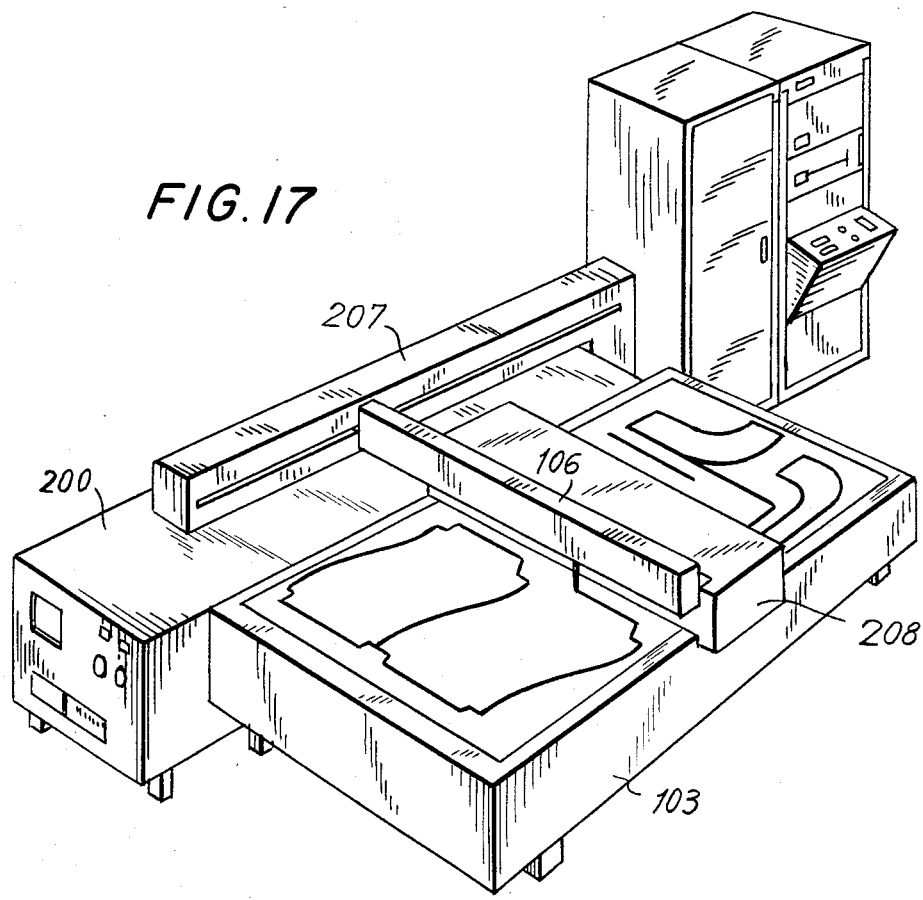
FIG. 17 is a perspective view of the apparatus of the present invention including a laser cutting apparatus.
Figure 18:
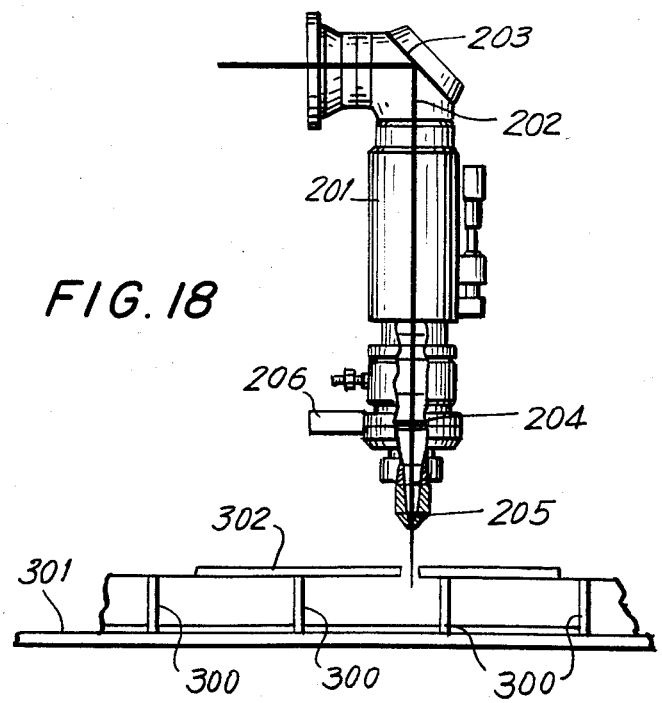
FIG. 18 is a detailed, partially sectional view, of the laser cutting nozzle assembly of the apparatus of FIG. 17.

The method and apparatus for a laser equipment will be set forth in greater detail, particularly with regard to FIGS. 17 & 18. In general, a focused laser beam delivery nozzle is mounted on the carriage of the plotting table which carriage is driven by an X-drive controller 124 in a first direction and a Y-drive controller 122 in a second direction, generally at right angles to each other. The computer generates pulses respectively to the X and Y motors via playback information retrieval device 50 with the pulses supplied to the X motor being sufficient to move the carriage along the table a distance equal to the X component of the desired movement, and the number of pulses supplied to the Y motor sufficient to move the focused laser beam along the carriage a distance equal to the Y component of the desired movement. A velocity comparator 150 regulates and X and Y drive and a laser power control generator 130, which provides a linear power output signal, preferably coupled with a laser intensity control 140, coordinates the intensity of the laser beam with the speed of movement as generated by the X and Y motors. In this manner, the desired laser beam intensity, given the speed of movement of the laser beam relative to the sheet stock, is controlled for proper energy delivery at the cutting point. This is necessary so that the appropriate amount of laser cutting power is supplied to the sheet metal stock depending on the speed of movement of the carriage on which the laser head is mounted.

While the size and lengths of duct fittings are infinite in number and variety, it has been discovered that rectangular duct construction fittings can be reduced to fifteen varieties of the four general construction types as illustrated in FIGS. 3-1–3-15.

Figure 3:
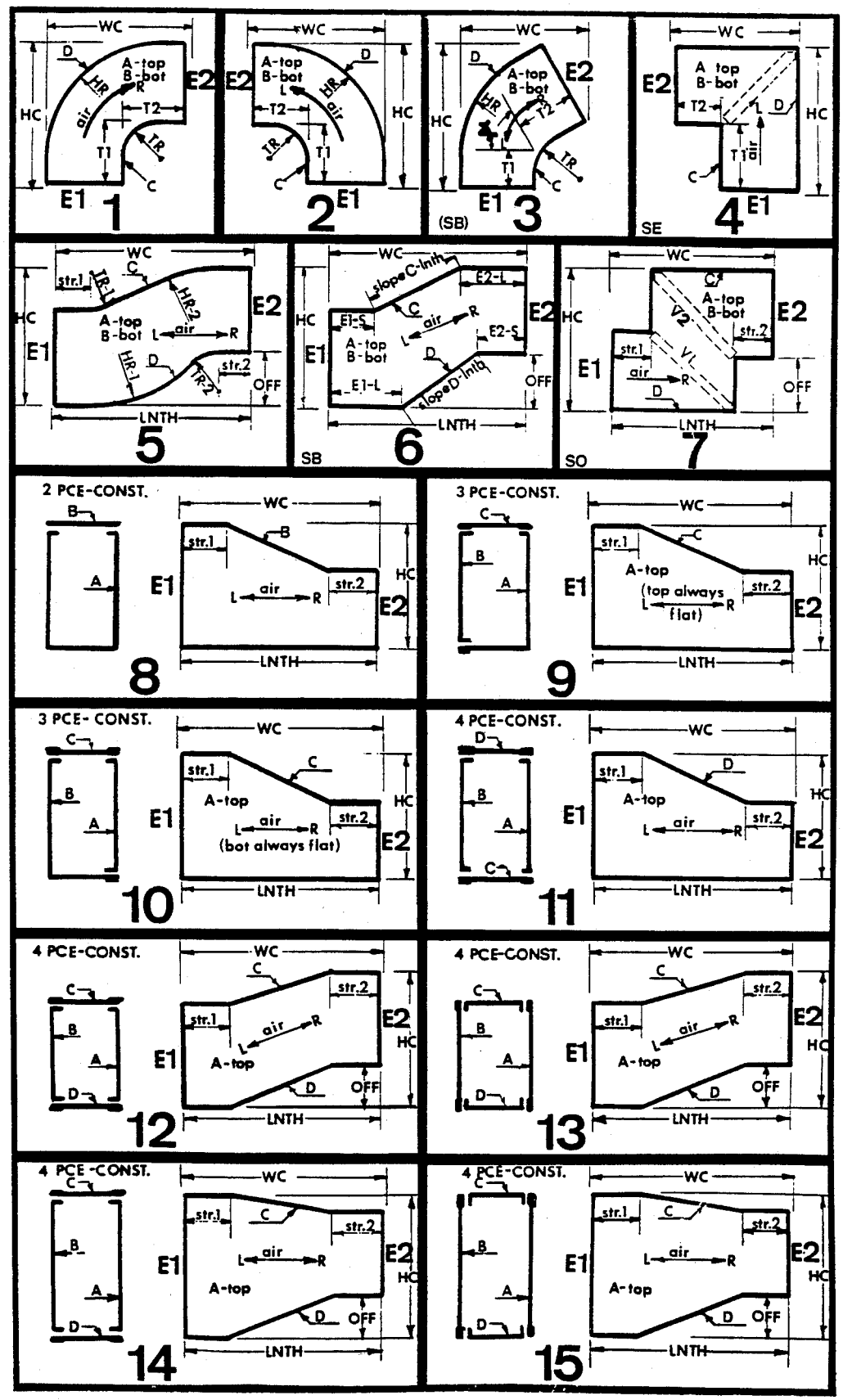

FIGS. 3-1, 3-2 and 3-4 represent the fitting type generally referred to in the industry as an elbow, which is a fitting which turns ninety degrees. FIG. 3-3 represents a fitting which turns other than ninety degrees and is generally referred to in the industry as a bevel.

FIGS. 3-5, 3-6, and 3-7 represent various forms of the fitting type generally referred to in the industry as offset fittings. FIGS. 3-8 through 3-15 are generally referred to as transition fittings. They connect ducts of differing perimeter dimensions either in general linear alignment, such as in FIGS. 3-8 through 3-11 and 3-14 through 3-15 or in offset relationship, such as in FIGS. 3-12 and 3-13.

As is noted in FIGS. 3-8 through 3-15, it is possible to fabricate transition fittings either as two-piece constructions as shown in FIG. 3-8, three-piece constructions as shown in FIGS. 3-9 and 3-10 or four-piece constructions as shown in FIGS. 3-11 through 3-15.

Each side of the fitting is identified in FIG. 3 by the letters A, B, C and D. Curvature information, such as a throat radius, is identified as TR and throat length is identified as T1 and T2. End widths are identified as E1 and E2. Width and height are identified by WC and HC, respectively.

In the practice of the present invention, an operator will input information to the microprocessor 20 by typing on the keyboard an identification as to which type of fitting is desired. For example, by typing a "T", a transition fitting is identified, as an "O" for an offset fitting, or a "B" for a bevel fitting, or an "E" for an elbow fitting. The computer will then request dimensional information and, based upon the inputted dimensions, the computer will mathematically create the pattern shapes, as hereinafter more particularly explained, and then request information regarding the next piece.

In order to perform the selection process, the computer must mathematically create configurations which will, when combined, represent each side of the desired fitting and then compute the position of the patterns with respect to the stock material to result in least waste.

As illustrated in FIGS. 4A–4D all rectangular duct fittings, while varying in size, can be mathematically interpreted as one of three or four shapes. The four shapes indicated are schematic in nature. S1 and S2 in combination with L1 and L2 represent the size and lock allowances for interconnection of the fittings with straight duct work. See also FIG. 13.

By modifying the dimensions A-G in any of the fittings, all required shapes common to rectangular fittings can be described, mathematically optimized and plotted out on a sheet of material.

Figure 4A:
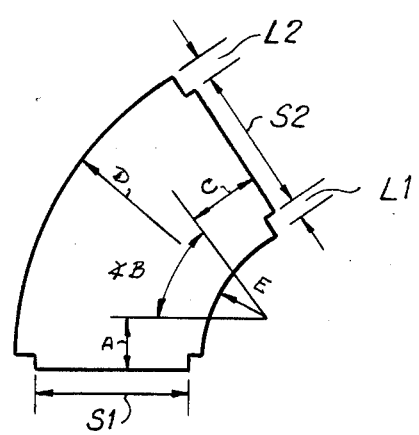
FIGS. 4A-4D are schematic representations of mathematically generated geometric patterns in accordance with the present invention.

For example, in FIG. 4A modification of the angle B from an acute to an obtuse angle can create a semi-circle. Modifications of dimensions F and G in FIG. 4C can produce a rectangle.

Figure 4B:
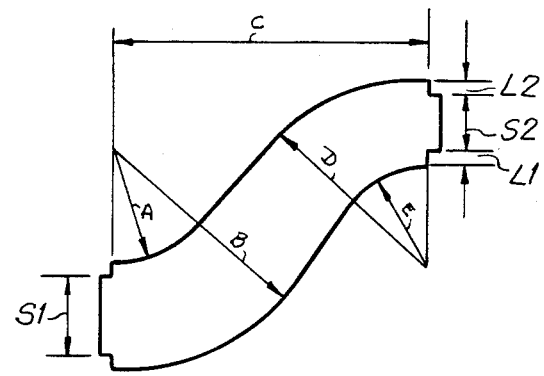
Figure 4C:
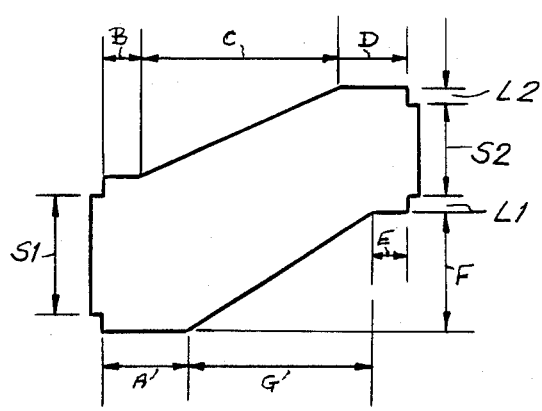
Figure 4D:
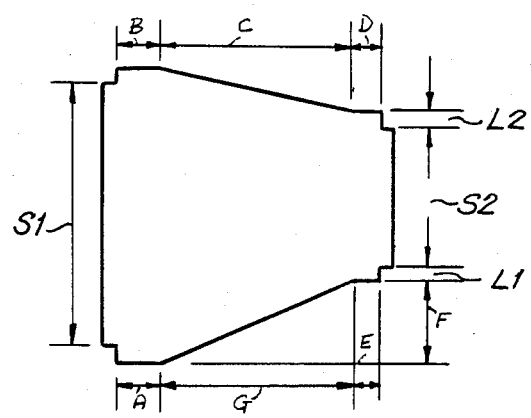

As can be readily appreciated from the foregoing, in rectangular duct work all shapes can be produced on the basis of the four geometric figures illustrated; specifically, an annular segment of a circle as shown in FIG. 4A; dual interconnected annular segments of circles taken about centers of generation which are spaced from each other as shown in FIG. 4B; an approximate rhomboid as shown in FIG. 4C and an approximate trapezoid as shown in FIG. 4D. While it is noted that, as illustrated, FIG. 4C is not a true trapezoid, it should be readily apparent that a trapezoid is easily generated by modification, for example, of the dimensions of F and G.

It should also be noted that variations in the dimensions of FIG. 4C will permit the creation of shapes such as shown in FIG. 4D. However, it has been found that it is preferable to identify shapes in accordance with both FIGS. 4C and 4D as operators are generally those having some training in the duct fabrication industry and are more likely to recognize FIG. 4C as a transition offset combination fitting and FIG. 4D as a reducing transition configuration.

The present invention, further recognizing that opposite sides of rectangular fittings are similar in profile, provides a computer program or algorithm for optimizing the interpositioning of patterns relative to each other to create a fitting which can be mathematically expressed on the basis of four equations.

Figure 5:
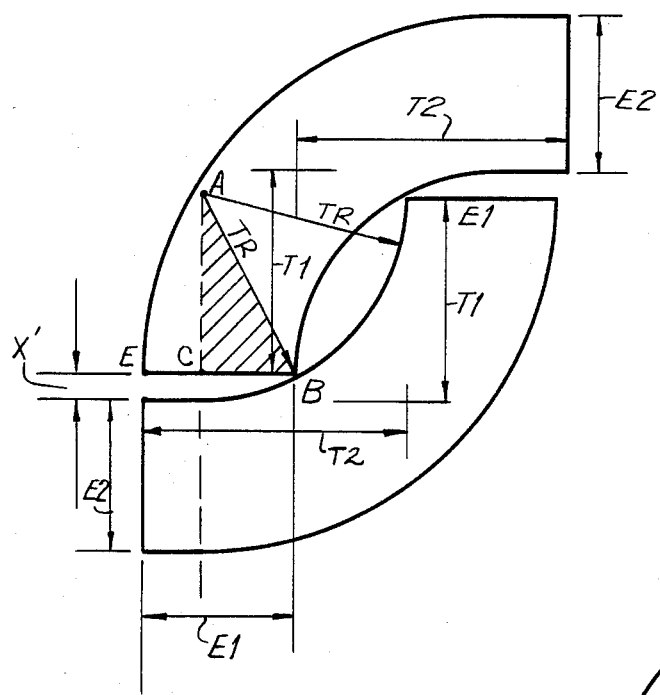
Figure 6:
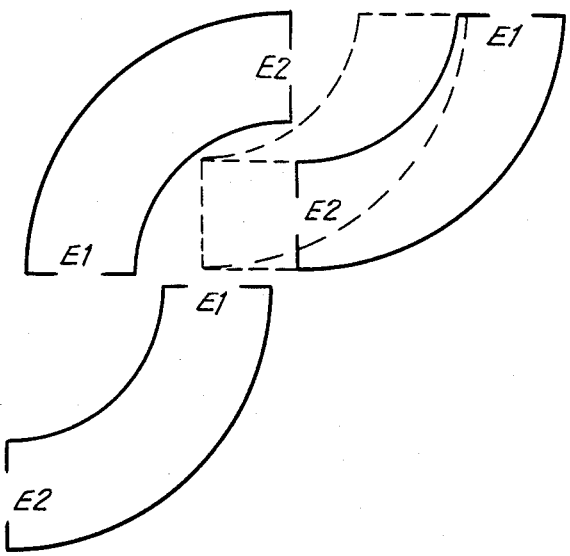

FIGS. 5 and 6 set forth in schematic presentation the positional arrangement of two patterns generated on the basis of FIG. 4A. As illustrated in FIGS. 5 and 6, E1 represents the width of a respective end of each of the patterns, E2 represents the respective width of the other ends; T1 represents a first throat length and T2 represents a second throat length; and TR represents the throat radius size. On the basis of the above information, the optimum distance between patterns, illustrated as X' can be determined as follows:

Triangle A B C is determined:

$$\text{Line } EC = T2 - TR$$

$$\text{Line } CB = E1 - EC$$

$$\sqrt{TR^2 - CB^2} = CA$$

$$TR - CA = X'$$

Accordingly, the computer program stored in memory 10 will position patterns of the type shown in FIG. 5 so that the distance X' equals the specific value determined by the known geometric quantities.

FIG. 5 represents a first mathematical positioning of two patterns and FIG. 6 a second, the positions of FIG. 5 and 6 representing the only two comparisons required as they are the only two possible juxtapositions of curved parts which could yield the most optimized interfittings.

Figure 7:
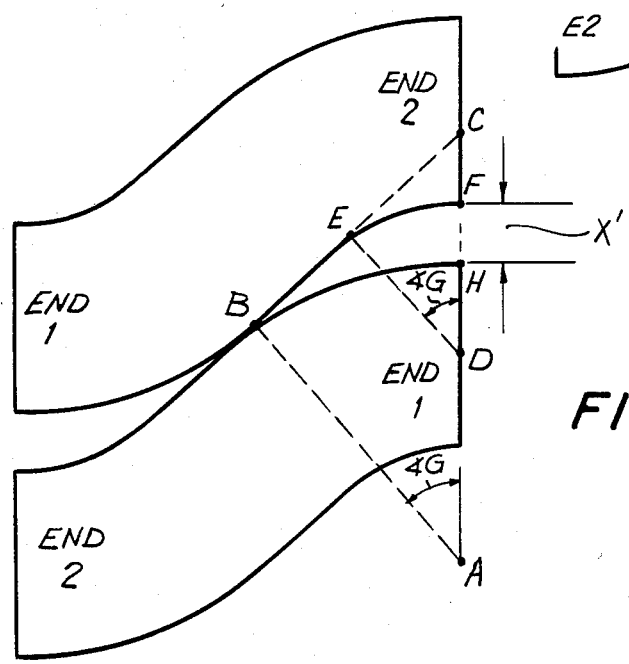

FIG. 7 represents the optimum positioning of patterns geometrically created on the basis of FIG. 4B with X' again representing the optimum distance between patterns. The solution for X' is set forth below.

KNOWN:
BA = HEEL RADIUS
DE = THROAT RADIUS
∢G (solved for as being a direct function of the known degree of offset)

$$\text{Cosine } \angle G = \frac{BA}{CA} \quad \text{Cosine } \angle G = \frac{ED}{CD}$$

SOLVE FOR $CA$     SOLVE FOR $CD$ $$CA = \frac{BA}{\cos \angle G} \quad CD = \frac{ED}{\cos \angle G}$$

$$CH = CA - BA \; (BA = HA)$$

$$CF = CD - ED \; (ED = FD)$$

$$CH - CF = X' = \text{OPTIMUM DISTANCE}$$

Again, the patterns are positioned so that the distance X' uniquely determined by the known geometric quantities.

Figure 8:
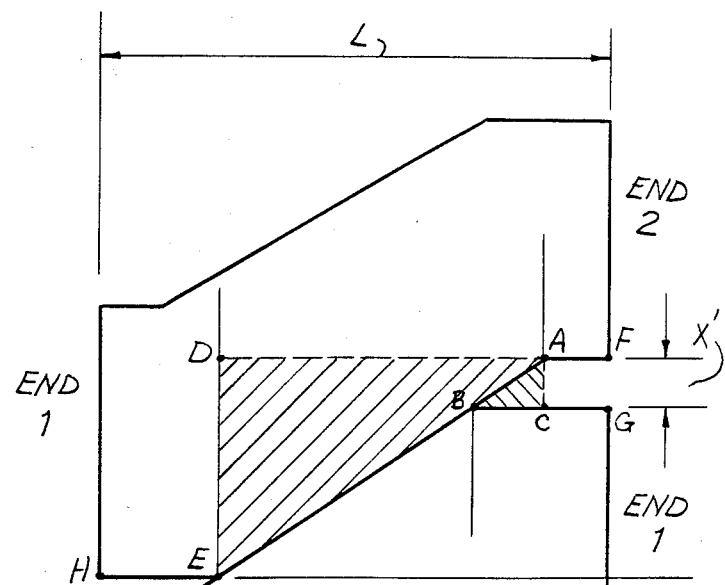
Figure 9:
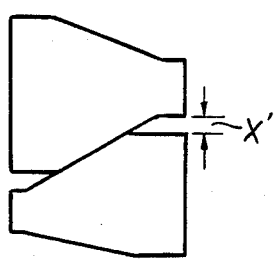

As hereinbefore noted, geometrically both the shapes of FIGS. 4C and 4D are based upon the same mathematical formulation. In a like manner, the optimized positioning of the patterns of each is the same and is illustrated in FIGS. 8 & 9 on the basis of the following:

KNOWN:
AF = STRAIGHT AT END 2
BG = STRAIGHT AT END 1
L = LENGTH OF FITTING
HE = STRAIGHT AT END 1
DE = OFFSET DISTANCE
BC = BG - AF
DA = L - (AF + HE)
Triangle ABC is similar to Triangle EAD $$\frac{DE}{DA} = \frac{X'}{BC} \text{ or } \frac{DE \times BC}{DA} = X'$$

Figure 10:
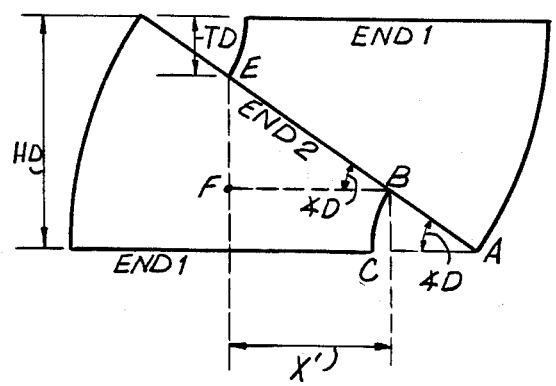
Figure 11:
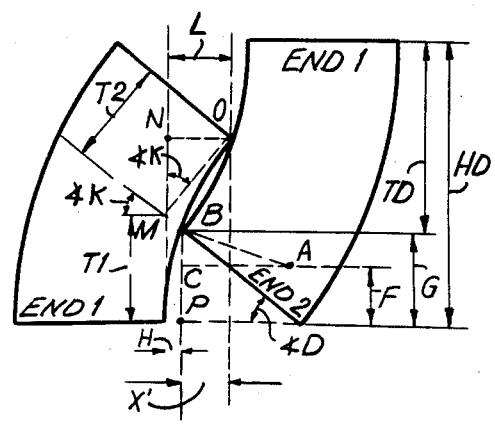

FIGS. 10 & 11 set forth the method of determining optimized positioning of paired patterns of a geometric shape based upon FIG. 4A where the fitting will be a bevel type rather than an elbow type.

It has been discovered that if the throat height TD is less than one half the heel height HD as shown in FIG. 1D, the following formula is applicable:

KNOWN:
BA = THROAT RADIUS
D = ANGLE OF BEVEL
EA = WIDTH AT END 2
EB = EA - BA
In Triangle EBF:

$$\text{COSINE } \angle D = \frac{X'}{EB}$$

$$\cos \angle D \times EB = X'$$

If however, throat height TD is greater than half the heel height HD as shown in FIG. 11, the following formula is applicable:
KNOWN:
BD = END 2 WIDTH
BA = THROAT RADIUS

F=STRAIGHT ON FITTING
T1=THROAT 1 LENGTH
T2=THROAT 2 LENGTH

In Triangle $DBP$, SINE $\not\triangleleft K = \dfrac{BP}{BD}$

SINE $\not\triangleleft K \times BD = BP$ $BP = G$

In Triangle $ABC$, $CA = \sqrt{BA^2 - (G - F)^2}$ $BA - CA = H$

In Triangle $MNO$, SINE $\not\triangleleft \underline{K} = \dfrac{NO \text{ (or } L)}{MO \text{ (or } T2)}$ SINE $\not\triangleleft K \times T2 = L$ $L - H = X' =$ OPTIMUM OVERLAP As hereinbefore noted, it is not merely the interpositioning of parts for optimizing material usage which must be considered but also, a critical factor is the ability to easily and efficiently separate the parts. Ideally, as many common edges as possible which permit a clear cutting path should be employed.

Figure 12:
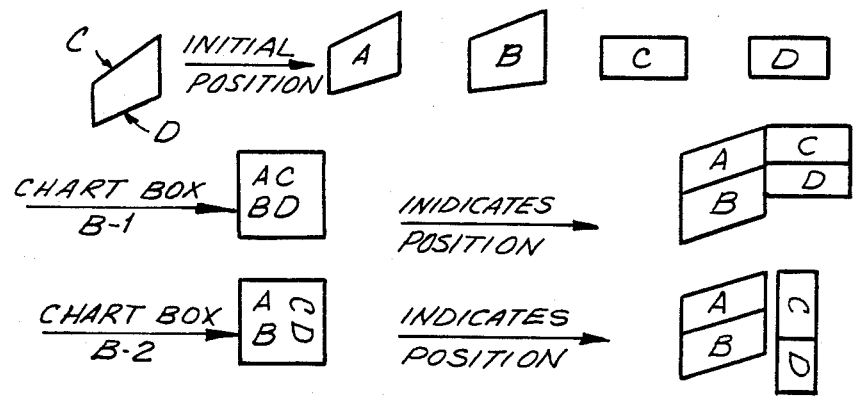

In accordance with the present invention it has been discovered that certain basic positions in combinations will yield a maximized material usage and cutting pattern. FIG. 12 schematically represents a hypothetical problem of positioning four mathematically created pattern shapes A, B, C and D which represent the components of a transition fitting.

Having created the mathematical patterns A, B, C and D, the various orientations of the patterns to each other are compared in accordance with the protocol set forth in the Table below. This Table represents, in graphic form, the information described in the program listing above with respect to the positioning of the patterns for optimizing material usage. For example, Table box A1 corresponds to position 1 above, Table box A8 corresponds to position 8 above, Table box B1 corresponds to position 9 above and Table box B8 corresponds to position 16 above, etc.

TABLE

| | 1 | 2 | 3 | 4 | 5 | 6 | 7 | 8 |
|---|---|---|---|---|---|---|---|---|
| A | A / B D / C | A / B D / ᴗ | A / B ᴗ / C | A / B ᴗ / ᴗ | A / B C / D | A / B C / ᴗ | A / B ᴗ / D | A / B ᴗ / ᴗ |
| B | A C / B D | A ᴗ / B ᴗ | A ᴗ / B D | A C / B ᴗ | A / B D C | A / B D ᴗ | A / B ᴗ C | A / B ᴗ ᴗ |
| C | A / B / D C | A / B / ᴗ C | A / B / ᴗ ᴗ | A / B / D ᴗ | A / B / C D | A / B / ᴗ D | A / B / C ᴗ | A / B / ᴗ ᴗ |
| D | ᵇᴀ D / C | ᵇᴀ D / ᴗ | ᵇᴀ ᴗ / C | ᵇᴀ ᴗ / ᴗ | ᵇᴀ C / D | ᵇᴀ C / ᴗ | ᵇᴀ ᴗ / D | ᵇᴀ ᴗ / ᴗ |
| E | ᵇᴀ C / D | ᵇᴀ ᴗ / ᴗ | ᵇᴀ ᴗ / D | ᵇᴀ C / ᴗ | ᵇᴀ D C | ᵇᴀ D ᴗ | ᵇᴀ ᴗ C | ᵇᴀ ᴗ ᴗ |
| F | ᵇᴀ / D C | ᵇᴀ / ᴗ C | ᵇᴀ / ᴗ ᴗ | ᵇᴀ / D ᴗ | ᵇᴀ / C D | ᵇᴀ / ᴗ D | ᵇᴀ / C ᴗ | ᵇᴀ / ᴗ ᴗ |
| G | ᴀ / ᵇ D / C | ᴀ / ᵇ D / ᴗ | ᴀ / ᵇ ᴗ / C | ᴀ / ᵇ ᴗ / ᴗ | ᴀ / ᵇ C / D | ᴀ / ᵇ C / ᴗ | ᴀ / ᵇ ᴗ / D | ᴀ / ᵇ ᴗ / ᴗ |
| H | ᴀ C / ᵇ D | ᴀ ᴗ / ᵇ ᴗ | ᴀ ᴗ / ᵇ D | ᴀ C / ᵇ ᴗ | ᴀ / ᵇ D C | ᴀ / ᵇ D ᴗ | ᴀ / ᵇ ᴗ C | ᴀ / ᵇ ᴗ ᴗ |
| I | ᴀ / ᵇ / D C | ᴀ / ᵇ / ᴗ C | ᴀ / ᵇ / ᴗ ᴗ | ᴀ / ᵇ / D ᴗ | ᴀ / ᵇ / C D | ᴀ / ᵇ / ᴗ D | ᴀ / ᵇ / C ᴗ | ᴀ ᵇ / C ᴗ D |

TABLE-continued

| | 1 | 2 | 3 | 4 | 5 | 6 | 7 | 8 |
|---|---|---|---|---|---|---|---|---|
| J | A B D<br>C | A B D<br>∩ | A B ∪<br>C | A B ∪<br>∩ | A B C<br>D | A B C<br>∪ | A B ∩<br>D | A B ∩<br>∪ |
| K | A B C²<br>D | A B ∩<br>∪ | A B ∩<br>D | A B C<br>∪ | A B D C | A B D ∩ | A B ∪ C | A B ∪ ∩ |
| L | A B<br>D C | A B<br>∪ C | A B<br>∪ ∩ | A B²<br>D ∩ | A B²<br>C<br>D | A B<br>∩<br>D | A B<br>C<br>∪ | ∩<br>∪ |
| M | E C<br>E D | E ∩<br>E ∪ | E C<br>E ∪ | E ∩<br>E D | E²<br>E<br>C<br>D | E<br>E<br>∩<br>D | E<br>E<br>∩<br>∪ | E<br>E<br>C<br>∪ |

The orientation of the letters A, B, C and D represents the positions being computed. Thus, FIG. 12 illustrates the orientation of Table boxes B1 and B2.

As used in the above Table the numerals 1 or 2 represent an additional position rotation which has been found advantageous for patterns mathematically created on the basis of FIGS. 4C and 4D. The numeral 1 indicates that A and B will also be evaluated both in mirror image and in inverted mirror image. The numeral 2 indicates that C and D will be evaluated in mirror image and inverted mirror image.

The Table, with respect to patterns A, B, C and D, sets forth 96 basic arrangements (rows A–L × columns 1–8), but due to mirror image and reverse mirror image combinations, many more comparisons are made. Further, based upon the fact that certain kinds of construction permit a pairing of identical patterns or at least patterns with a single common edge, a number of comparisons are made as paired comparisons.

Thus, in instances where A and B can be combined and D and C can be combined and, as "doubles", compared one to the other, side to side or top to bottom, or a paired A and B could be combined with an individual C and D either in side by side relationship with respect to A and B generally or parallel to adjacent sides of the combined A and B or along a line beneath A and B, many additional combinations are possible. In all, 192 possible combinations are computed and the optimum position, once located, is selected. It must also be noted that other optimization schemes known in the art may also be utilized instead of the particular preferred optimization scheme described in detail here. Although the invented optimization scheme is particularly efficient, other, simpler techniques which require less computer memory capacity may be used, for example, the "outside rectangle" technique, wherein the rectangle within which each particular pattern fits is compared and optimized with the others. Additionally, once the technique for optimizing is described, such as is shown herein, it will be within the skill of one skilled in the art of computer programming to program a general purpose digital computer of sufficient memory capacity to accomplish the described optimization.

The letter E in the Table indicates an oversized pattern that cannot be rotated on the sheet material as one dimension is longer than the stock width. There are, as illustrated in Table boxes M1 through M8, eight additional possible basic positions relative to either an oversized A or B pattern as combined with C and D patterns with mirror images, and therefore eight additional basic positions are compared.

In all, the Table reflects 208 positions which mathematically compare those combinations which will yield the optimized material usage and severance with a minimum of cutting steps for all the patterns of a fitting on a sheet and which preferably lays out such patterns so that the patterns which make up the fitting can be separated as a group of patterns by a single, widthwise cut across the sheet material.

Figure 20A:
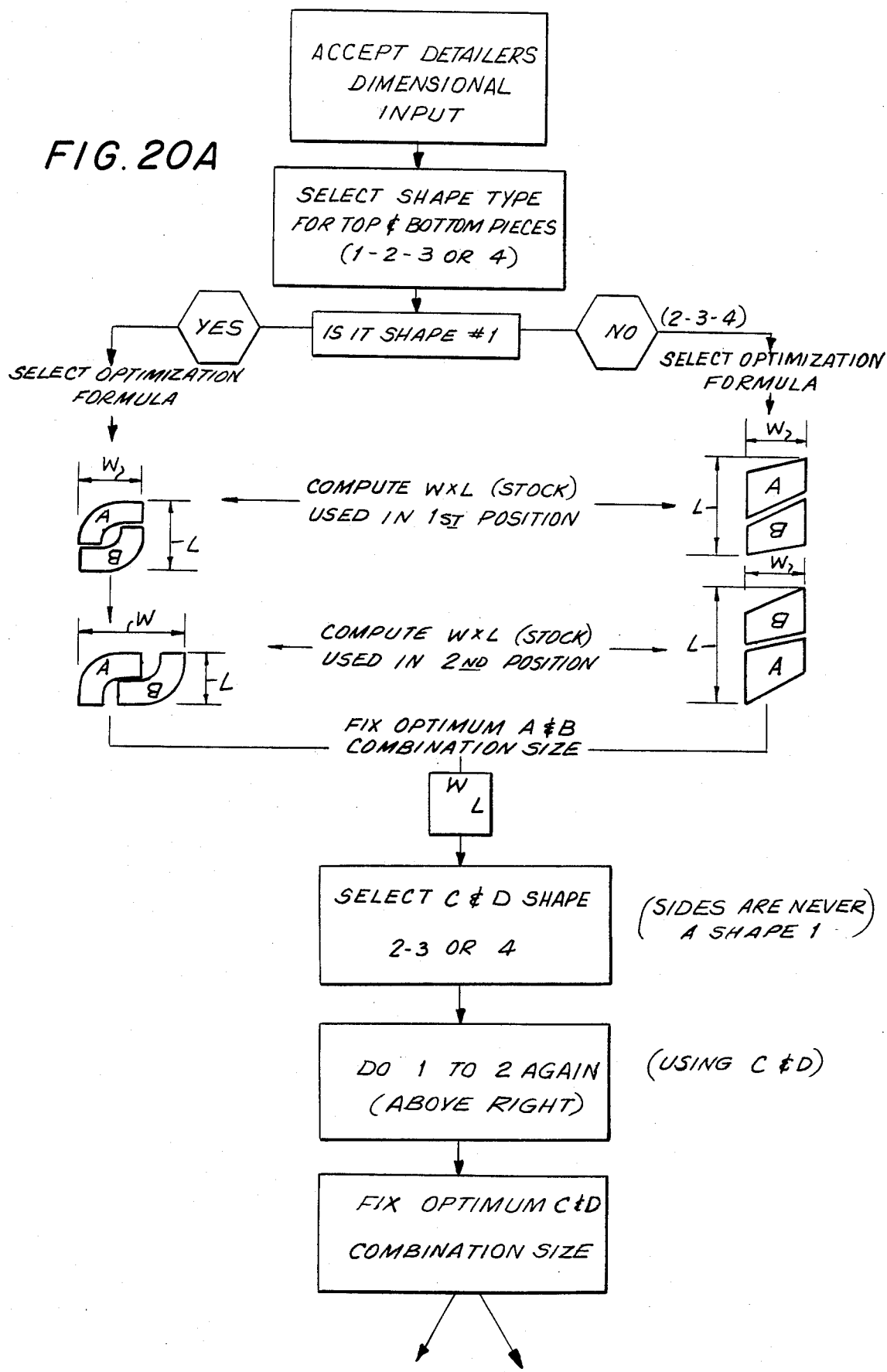
FIGS. 20A & 20B in combined form represent a flowchart of the computer program implementing the preferred mathematical optimization in accordance with the present invention.
Figure 20B:
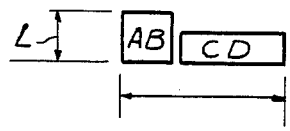
Figure 20B:
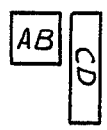
Figure 20B:
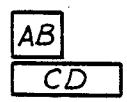
Figure 20B:
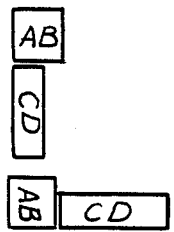
Figure 20B:
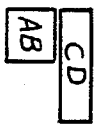
Figure 20B:
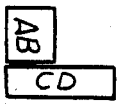
Figure 20B:
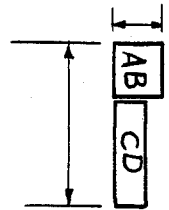
Figure 20B:
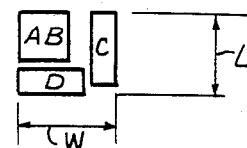
Figure 20B:
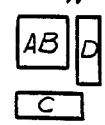
Figure 20B:
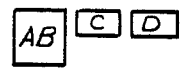
Figure 20B:
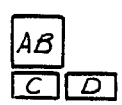
Figure 20B:
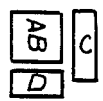
Figure 20B:
Figure 20B:
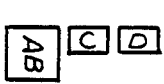
Figure 20B:
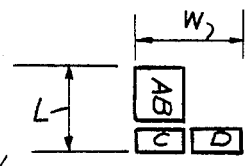

The sequential steps of the above-described selection is illustrated in the flowcharts shown in FIGS. 20A and 20B.

FIGS. 20A and 20B, taken together, are a flowchart of the program stored in memory 10. As shown, in response to a detailer's input of fitting type and dimensional data concerning the particular fitting, the computer will select the appropriate optimization routine based on the fitting type. As shown, if the fitting type is an elbow (shape #1) the program will enter the subroutine shown on the lefthand side of FIG. 20A. If the fitting type is one of the other three types, the program will enter the particular subroutine for that type fitting, as indicated on the right-hand side of FIG. 20A. For the sake of clarity, only the subroutine for one of the other fitting types is shown on the right-hand side of FIG. 20A, although there are other subroutines as discussed above for the remaining fitting types. The program will then cycle through the entire subroutine for the particular fitting type and select the optimum arrangement for the positioning of two patterns of the fitting. At this point, only two sides of the fitting have been optimized in accordance with the mathematical relations described above with respect to FIGS. 5 through 11.

Once the optimum A and B combination has been obtained, the program then selects the remaining sides of the fitting. The remaining sides can never be in the shape of an elbow or bevel fitting if the A and B sides are already configured as elbows or bevel fittings. The program then repeats the subroutines on the right-hand side of FIG. 20A for the remaining sides of the fitting and selects the optimum combination in accordance with the mathematical relations described earlier.

The two combinations thus obtained are then compared as shown in FIG. 20B. FIG. 20B is an abbreviated version of the optimization steps shown in the Table and program listing above. The lefthand side of FIG. 20B shows a number of optimization steps wherein "doubles" or the groupings of two pattern sides are compared to each other. Although only eight comparisons are shown for sake of clarity, the program will cycle through all the steps indicated in the Table or program listing above.

In addition to comparing "doubles", the combination of a "double" with individual ones of the remaining patterns is also tried, as shown by the right-hand side of FIG. 20B. This is also indicated in the above chart by optimization steps D1 through D8, G1 through G8 and J1 through J8.

The reason why this is done is related to the heating and ventilating industry. Of the 4 fitting types described—both the elbow or bevel (FIG. 4A) and the radius offset (FIG. 4B) are such that the remaining two sides will virtually always be rectangles, appropriately bent to shape, and offer little, if any combined optimization.

In the 2 remaining fitting types, offset (FIG. 4C) and converging transition fittings (FIG. 4D), it is common practice to present the fitting in its most dramatically offset or converging view, so that the angular variance (and potential optimization) is normally greatest in the top and bottom pieces. The results of this is that far less optimization saving can be expected in the combining of side pieces as compared to the top and bottom pieces.

Due to the limitations of standard industry stock sizes, it is often impossible to accommodate two "pairs" of combined blanks and it becomes practical to also compare the side pieces individually to the top and bottom combination.

Through this procedure it is insured that the sides (offering less optimization saving) are given priority if separation is required.

Once the optimum stock selection for the particular fitting entered is determined, the resultant "stock length" is evaluated with the previous piece processed to determine if it will also fit on the same stock cut up to the table length maximum, which is normally about 8 to 10 feet long.

Should it be such that the stock for two or more fittings is less than the stock length maximum, it becomes practical to have as many such fittings as possible plotted or cut out of one large length of stock to save cutting and handling time. This is accomplished by adjusting the "starting point" of each plot, to be described later.

If the piece being processed can also fit on the same blank in the X direction or plotting table maximum length, the X dimension of each pattern starting point is increased by the length of the previous piece plotted.

Should two pieces or more be possible to combine across the Y direction (shorter stock width—usually approximately 5 feet), the Y dimension of each starting point is increased by the total Y dimension of the previous piece plotted.

Once the optimum arrangement has been selected, the data is transmitted, either directly or via another medium, such as paper tape, to the plotting table 120.

Figure 13:
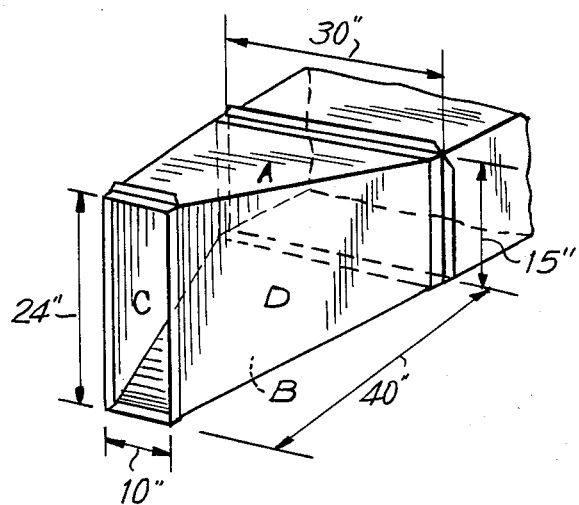

The benefit of the present invention illustrated using as an example the transition fitting shown in FIG. 13.

Figure 14:
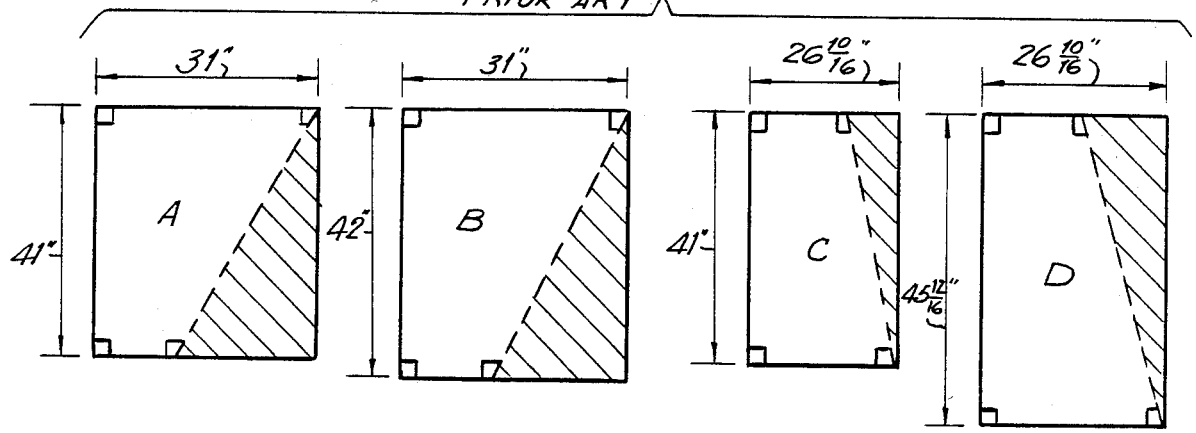

Prior to the present invention, a technician would be provided with basic dimensional information for each of the four sides of the fitting. The technician would either hand sketch a drawing or fill in the dimensions on a pre-printed form. The form would then be passed to a skilled technician who, employing mathematics, charts and drafting tools, would compute the exact pattern size for each of the four parts with allowances for a pitch or angle. Assuming the technician selects the correct stock, which, in the example of FIG. 13 is a 48 inch wide sheet, the patterns would have been laid out and cut. The prior art layout is shown in FIG. 14 and assuming appropriate skill by the technician, these patterns could be laid out in approximately 15 minutes and use approximately 38.41 square feet of sheet metal.

Figure 15:
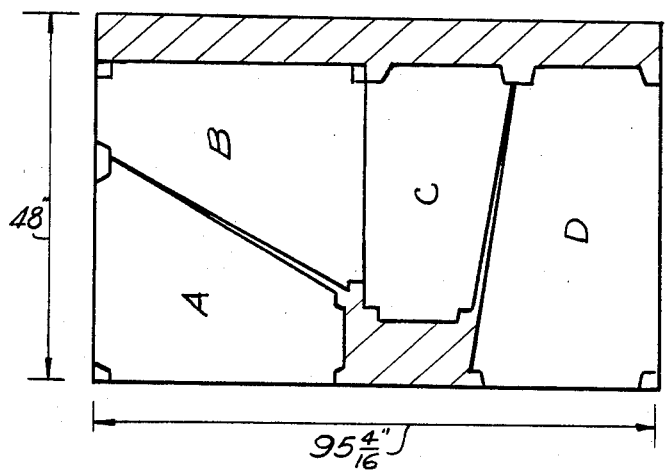

In accordance with the present invention, the same information which was handwritten and given for the initial sketch is provided to an operator who inputs the same by answering a series of questions which request the data. The operator merely identifies the type of fitting, which in this case is a transition fitting and the computer requests sequentially the dimensions required to create the fitting according to the program stored in memory. In accordance with the present invention, the appropriate sheet stock is selected and the entire plotting time is 15 seconds with a material usage of 31.75 square feet. The layout in accordance with the present invention is shown in FIG. 15.

In addition to optimizing the usage of the sheet material, the microprocessor is programmed to identify groups of patterns of a common job lot so that a job lot can be identified and an inventory created. It lists the patterns in the order they are to be plotted on the plotting table and, where fabricators have numerical control tape readers at the coil line which feeds out the sheet material, the computer can also punch out a tape to directly operate the metal feed onto the plotting surface.

Figure 16:
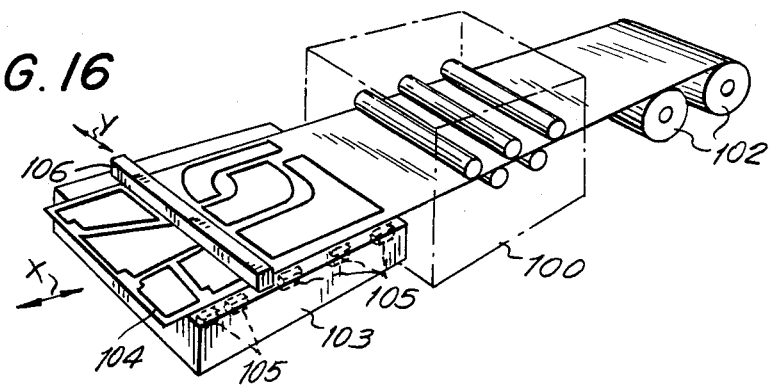
FIG. 16 is a schematic representation of a plotting apparatus in accordance with the present invention.

Referring to FIG. 16, there is illustrated schematically, a preferred form of the invention including a coil line feed 100 which feeds coil from the coil line 102 to the plotting table 103. A first length 104 if metal required to form the first fitting is advanced by the coil feed 100 onto the plotting table 103. The plotting table 103 is particularly configured for use with sheet metal. A series of electromagnetic devices 105, preferably a series of fifteen, are built into the surface of the plotting table 103 to securely retain the sheet metal against untoward movement during the plotting step. Where the fabrication material does not lend itself to magnetic securement, such as where the material is aluminum or fiberglass, other securement means such as clamps or vacuum tubes (not shown) may be employed.

The top of the plotting table is preferably made of a material such as stainless steel, which can withstand the weight and wear of sheet metal and preferably is scribed or etched so that it contains indicia conforming to standard widths of stock sheet ordinarily used in the industry. The coil feed mechanism 100, having advanced the length of metal required for the laying out of a first fitting, a plotter, which operates in accordance with the data generated by the microprocessor either directly or through a paper tape input, plots out the patterns required for the fitting.

Preferably an X-Y plotter of the type customarily used for drawing or plotting lines or other information on a sheet of paper or the like is employed, with a pen, scribe or printing mechanism of the type which will write on sheet metal being carried by a carriage 106. The carriage 106 is supported for movement relative to the plotting table 103 in the direction of the X axis and movable relative to the carriage in the Y axis.

By moving the carriage 106 relative to the top of the plotting table and by moving the scribe relative to the carriage 106, the patterns can be drawn on the sheet metal.

Once a first set of patterns for a fitting has been laid out, the coil line feed mechanism 100 advances a further length of metal required for a second fitting. Plotting of the second fitting is now accomplished in the same manner as that of the first.

A separating mechanism, often in the form of a flying shear (not shown) separates the first set of patterns which made up the first fitting and the same can be cut and assembled either at the fabricator's plant or on site. The separating mechanism may either precede or follow the plotting table.

For those fabricators who do not have automatic coil line feeding, pre-cut sheets of metal, cut in accordance with the instructions provided by the microprocessor, may be placed on the plotting table and laid out in the manner heretofore described.

Figure 19:
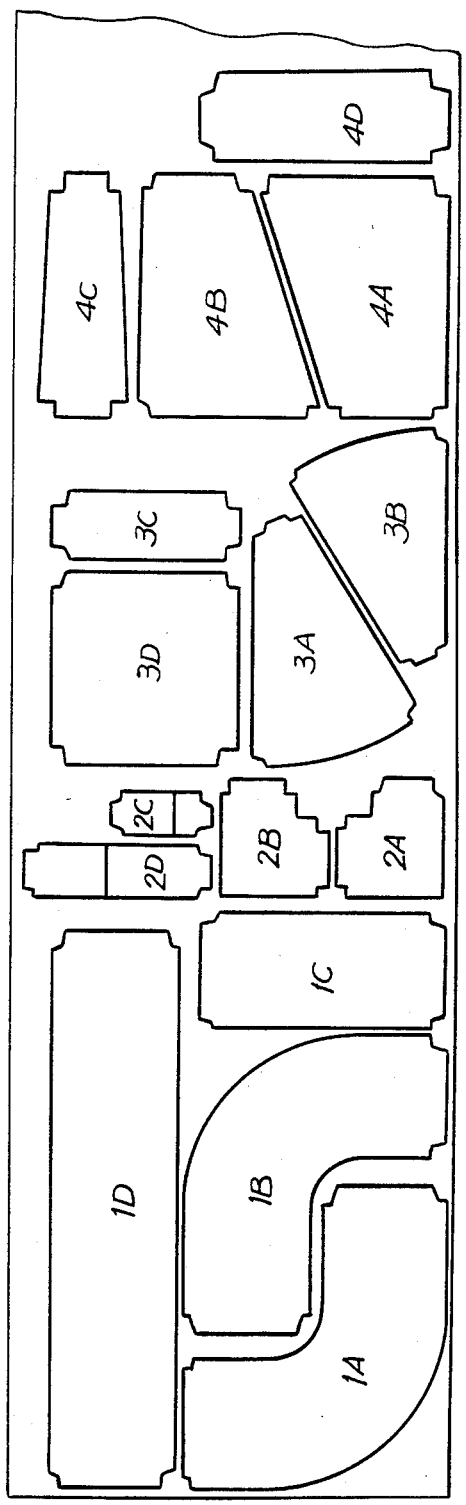
FIG. 19 is a plan view of a typical pattern showing optimization of material and cutting alignment in accordance with the present invention with spaces shown between the patterns for clarity.

FIG. 19 illustrates a typical positioning of patterns on the plotting table in accordance with the present invention. Spaces between patterns are shown for clarity, but as actually laid out, the patterns having common lines touch so that a single cutting severs a side or a portion of the side of two patterns. In FIG. 19, a plurality of groupings of patterns (1A–1D; 2A–2D; 3A–3D and 4A–4D) for four fittings are shown, with a single widthwise severance of the sheet metal possible to effect the severing of a group of patterns which comprise an individual fitting.

The data read from information retrieval device 50 is fed to the X-Y plotting table 103 in sequential form. For each pattern or side of the fitting, a starting reference point is established. All data with respect to the outline of the pattern is based upon this starting point. The data is transferred in block format. A first block includes digital data concerning the location of the reference or starting point for the first pattern to be marked or cut. Once the reference or starting point has been determined, the marking or cutting device moves to this location on the plotting table. The next block of data gives information in digital form concerning the X and Y movement of the plotting head from the starting point. The plotting head moves in small straight line increments, although these increments are too small to result in any noticeable disparity from the desired pattern. Thus, the curved side patterns of an elbow fitting are actually formed by a large series of interconnected line segments. Once one pattern has been marked or cut, the next pattern of the same fitting is marked or cut. Again, a starting or reference point is first obtained and all the remaining points are then plotted.

FIG. 17 illustrates the apparatus of the present invention further including laser cutting means. As illustrated, a laser beam generating apparatus is provided and initiates a laser beam which is operably linked to the carriage 106 through use of mirrors which are preferably water cooled (not shown). As illustrated in FIG. 18, in lieu of a scribing instrument, a laser cutting attachment 201 is affixed to the carriage. The laser beam 202 is directed by mirror 203 through a series of lenses 204 through a nozzle 205 so that a focused laser beam will sever the sheet metal. Preferably the laser is a $CO_2$ laser with the gas inlet illustrated by 206.

The laser beam is shielded by beam covers 207 and 28 with the beam cover 208 carried by the carriage 106.

The energy required for the laser to cut (melt; atomize) must be coordinated with the speed at which the material is being cut. As hereinbefore described, the plotter employs two independently driven motors, one for the X-axis movement and one for the Y-axis movement. The speed of each motor will vary in accordance with the angle or curve of the line being described.

By providing a linear power output signal for the laser which is related to the combined speeds of the X and Y axes motors, the intensity of the laser beam can be modified and, as modified, correlated to the plotting movement of the nozzle of the laser as it traverses the plotting table as carried by the carriage 106.

In order to laser-cut the material on the plotting table a space separation is provided to permit energy focus, and this is illustrated in FIG. 18, where grid separators 300 support and maintain the sheet metal 302 in spaced-apart relationship from the steel table top 301. The space which is so provided allows for sufficient dissipation of the energy of the laser to avoid injury to the top 301 and yet allows sufficient energy to be focused at the sheet metal 302 to permit cutting.

Examples of components which can be used to implement the preferred embodiment of the invention include the following:

- 10—32K non-volatile RAM or Magnetic Core storage;
- 20—Digital Equipment Corp. Model 8A400;
- 30—Digital Equipment Corp. Model LA120 printer/keyboard
- 40—Digital Equipment Corp. TU—60 magnetic tape unit and PC—8—E paper tape punch/reader;
- 50—Gerber 4000 controller with paper tape reader;
- 60—part of LA 120 printer/keyboard;
- 70, 80, 90, 95 and 110—Coil Line feed controller and cutter (Iowa Precision Instruments);
- 120—Gerber 77 Plotting Table and Model 4000 controller modified as discussed herein;
- 122, 124, 130, 140 and 150—Coherent Model 46 $CO_2$ Laser Cutter and Controller modified as discussed herein.

There is thus provided a method apparatus by which an operator, ordinarily unskilled in the field can, in response to simple requests posed by a computer, provide basic pattern type and dimensional information which, in accordance with the program or algorithm of the present invention, will yield the patterns required for creation of a three-dimensional duct fitting, which patterns are laid out in a spatial relationship and which optimizes the use of material; positions all components of a fitting into relative juxtaposition; provides optimized cutting paths so that the least amount of cuts need be made to separate the patterns; preferably provides indicia to identify the patterns and the job to which they relate; preferably separates the patterns either in the form of individual patterns or by a single widthwise cut into a group of patterns which together form a fitting; and preferably provides hard copy information for use for on-the-job fabrication. The entire operation is accomplished with greater accuracy than heretofore permitted even with the intervention of the most skilled artisan and in a fraction of the time heretofore required.

It will be understood that the above description is exemplary of that which falls within the scope of the appended claims and that various modifications may be made without departing from the scope of the invention.

What is claimed is:

1. The method of creating a pattern or group of patterns for a three dimensional product which can then be fabricated from patterns of sheet material including the steps of:

creating, through mathematical calculation, the pattern of a selected portion of the end product on the basis of dimensional information;

creating, through mathematical calculation, the others of the patterns of the end product;

positioning all the patterns required for such end product in a grouping such that the grouping when aligned on a sheet material may be severed from the sheet material by a single, substantially straight, cut across the sheet material;

positioning selected pairs of patterns in said group with like edge configurations into relative juxtaposition, comparing said pairs of patterns to yield a juxtaposition which provides for optimum material usage and for severance of the patterns with a minimum of cutting steps; and converting the optimum pattern or group of patterns into physical form onto a sheet of material.

2. The method as claimed in claim 1 wherein said three-dimensional product is a generally rectilinear duct filling.

3. The method as claimed in claim 2 wherein said pattern is selected from a group of patterns which can be developed from one or more of the following:

(a) an annular segment of a circle;
(b) dual interconnected annular segments of circles taken about centers of generations which are spaced from each other; and
(c) a planar rectangular figure.

4. The method as claimed in claim 3 wherein said planar rectangular figure is a rhomboid.

5. The method as described in claim 3 wherein said planar rectangular figure is a trapezoid.

6. The method as claimed in claim 3 wherein said planar rectangular figure is a rhomboid and a further pattern of said group is a trapezoid.

7. The method as claimed in claim 1 wherein the positioning of patterns includes the steps of mathematically comparing the patterns which are intended to form opposite faces of said three-dimensional product.

8. The method as claimed in claim 1 wherein three-dimensional product is a generally rectilinear duct fitting selected from a group comprising:

(a) a transition fitting adapted to connect ducting of varying perimeter dimensions,
(b) an elbow fitting adapted to connect ducting oriented at 90 degrees to each other,
(c) a bevel fitting adapted to connected ducting oriented other than at 90 degrees or in parallel relationship to each other; and
(d) an offset fitting adapted to connect ducting extending in parallel, spaced apart relationship with radius curved form.

9. The method as claimed in claim 8 wherein opposite sides of said fitting are mathematically oriented for optimizing their interposition for laying out to permit the greatest incidence of commonly aligned surfaces.

10. The method as claimed in claim 9 wherein each pattern is developed from an annular segment of a circle having a radial angle of 90 degrees as shown in FIG. 5 of the drawings: and wherein, given the end widths E1 and E2, throat lengths T1 and T2, and throat radius TR of each pattern, the optimum distance between patterns is determined on the basis of the following equation in which X' is equal to the optimum distance between patterns:

$$\text{Line } EC = T2 - TR$$

$$\text{Line } CB = E1 - EC$$

$$\sqrt{TR^2 - CB^2} = CA$$

$$TR - CA = X'$$

11. The method as claimed in claim 10 wherein said comparison is calculated in two directions.

12. The method as claimed in claim 9 wherein the pattern is developed from dual interconnected annular segments of circles taken about centers of generation which are spaced from each other as shown in FIG. 7 of the drawings; wherein given BA is equal to the heel radius, given ED is equal to the throat radius and given angle G is the angle of offset; and in which X' is equal to the optimum distance between patterns, i.e., (a)

$$\text{Cosine angle } G = \frac{BA}{CA}$$

$$CA = \frac{BA}{\text{Cos. angle } G}$$

Solve for CA, (b)

$$\text{Cosine angle } G = \frac{ED}{CD}$$

$$CD = \frac{ED}{\text{Cos. angle } G}$$

Solve for CD, (c)

$$CH = CA - BA$$

$$CF = CD - ED$$

(d)

$$CH - CF = X'.$$

13. The method as claimed in claim 9 wherein the pattern is developed from a four-sided planar figure which further includes straight end extensions extending at an angle from the ends of said four-sided planar figure as shown in FIG. 8 of the drawings and in which given AF represents the said straight end extension of one of said patterns given, BG represents the said straight end extension of the other of said patterns; given L represents the length of the pattern; given HE represents the straight end of the pattern which includes straight end BG; and given DE is the offset distance and X' is equal to the optimum distance between patterns, i.e., (a)

$$BC = BG - AF$$

(b)

$$DA = L - (AF + HE)$$

(c) triangle ABC is similar to triangle EAD (d)

$$\frac{DE}{DA} = \frac{X'}{BC}$$

(e)

$$\frac{DE \times BC}{DA} = X'.$$

14. The method as claimed in claim 9 wherein the pattern is developed from an annular segment of a circle wherein the radial angle is less than 90 degrees and the throat height TD is less than one half the heel height HD as shown in FIG. 10 of the drawings: and given BA is the throat radius; given angle D is the angle of bevel; given EA is the width at the end of one pattern; and where in X' represents the optimum distance between patterns by solving the X' as follows:

(a)

$$EB = EA - BA$$

(b) in triangle EBF $$\text{COSINE angle } D = \frac{X'}{EB}$$

(c)

Cosine angle $D \times EB = X'$.

15. The method as claimed in claim 9 wherein the pattern is developed from an annular segment of a circle wherein the radial angle is less than 90 degrees and the throat height TD is greater than one-half the heel height HD as shown in FIG. 11 of the drawings: and wherein given BD is the width of the end of one of the patterns; given BA is the throat radius, given F is the straight extension to the pattern having end BD; given T1 is the throat length of one said pattern; given T2 is the other throat length and wherein X' is equal to the optimum spacing, as follows:

(a) In triangle BDP $$\text{Sine angle } K = \frac{BP}{BD}$$

(b)

Sine angle $K \times BD = BP$ (c)

$$BP = G$$

(d) In triangle ABC $$CA = \sqrt{BA^2 - (G - F)^2}$$

$$BA - CA = H$$

(e) In triangle MNO $$K = \frac{NO \text{ (or } L)}{MO \text{ (or } T2)}$$

(f)

Sine angle $K \times T2 = L$ (g)

$$L - H = X'.$$

16. The method as claimed in claim 9 wherein the patterns which mathematically represent a side of the fitting are compared in various orientations, one to the other, to select the optimum positioning prior to formation of the patterns.

17. The method as claimed in claim 16 wherein A represents the mathematically stored configuration of a first pattern, B represents the mathematically stored configuration of a second pattern, C represents the mathematically stored configuration of a third pattern, and D represents the mathematically stored configuration of a fourth pattern, wherein the combination of A, B, C, and D represents the three-dimensional fitting; and in which "X" indicates the positioning of the patterns in one direction along a first axis, and "Y" indicates the positioning of the patterns along another axis, the suffix "r" indicates the rotation of the particular pattern through 90 degrees, the suffix "1" indicates that the patterns are oriented in a single positon and the suffix "1:2" indicates that the patterns are positioned in mirror image and invented mirror image; said comparisons being as follows:

| | |
|---|---|
| Position 1: | X = A1, B1, C1;<br>Y = B1, D1. |
| Position 2: | X = A1, B1, C1r;<br>Y = B1, D1 |
| Position 3: | X = A1, B1, C1;<br>Y = B1, D1r. |
| Position 4: | X = A1, B1, C1r;<br>Y = B1, D1r. |
| Position 5: | X = A1, B1, D1;<br>Y = B1, C1. |
| Position 6: | X = A1, B1, D1r;<br>Y = B1, C1. |
| Position 7: | X = A1, B1, D1;<br>Y = B1, C1r. |
| Position 8: | X = A1, B1, D1r;<br>Y = B1, C1r. |
| Position 9: | X = A1:2, B1:2 + C1:2, D1:2;<br>Y = A1:2, C1:2 + B1:2, D1:2. |
| Position 10: | X = A1, B1 + C1r. D1r;<br>Y = A1, C1r + B1, D1r. |
| Position 11: | X = A1, B1 + C1r, D1;<br>Y = A1,d C1r + B1, D1. |
| Position 12: | X = A1, B1 + C1. D1r;<br>Y = A1, C1 + B1, D1r. |
| Position 13: | X = A1, B1 + D1 + C1;<br>Y = A1 + B1, D1, C1. |
| Position 14: | X = A1, B1 + D1 + C1r;<br>Y = A1 + B1, D1, C1r. |
| Position 15: | X = A1, B1 + D1r + C1;<br>Y = A1 + B1, D1r, C1. |
| Position 16: | X = A1:2, B1:2 + D1:2r + C1:2r;<br>Y = A1:2 + B1:2, D1:2r, C1:2r. |
| Position 17: | X = A1, B1, D1 & C1;<br>Y = A1 + B1' + D1, C1. |
| Position 18: | X = A1, B1, D1r & C1;<br>Y = A1 + B1 + D1r, C1. |
| Position 19: | X = A1, B1, D1r + C1r;<br>Y = A1 + B1 + D1r, C1r. |
| Position 20: | X = A1, B1, D1 + C1r; |

|  |  |
|---|---|
| Position 21: | X = A1:2, B1:2, C1:2, D1:2;<br>Y = A1:2 + B1:2 + C1:2 + D1:2. |
| Position 22: | X = A1, B1, C1R, D1;<br>Y = A1 + B1 + C1R + D1. |
| Position 23: | X = A1, B1, C1, D1r;<br>Y = A1 + B1 + C1 + D1r. |
| Position 24: | X = A1, B1, C1r, D1r;<br>Y = A1 + B1 + C1r + D1r. |
| Position 25: | X = B1r + A1r, C1 + D1;<br>Y = B1r, A1r, D1 + C. |
| Position 26: | X = B1r + A1r, C1r + D1;<br>Y = B1r, A1r, D1 + C1r. |
| Position 27: | X = B1r + A1r, C1 + D1r;<br>Y = B1r, A1r, D1r + C1. |
| Position 28: | X = B1r + A1r, C1r + D1r;<br>Y = B1r, A1r, D1r + C1r. |
| Position 29: | X = B1r + A1r, D1 + C1;<br>Y = B1r, A1r, C1 + D1. |
| Position 30: | X = B1r + A1r, D1r, C1;<br>Y = B1r, A1r, C1 + D1r. |
| Position 31: | X = B1r + A1r, D1 + C1r;<br>Y = B1r, A1r, C1r + D1. |
| Position 32: | X = B1r + A1r, D1r + C1r;<br>Y = B1r, A1r, C1r + D1r. |
| Position 33: | X = B1:2r + A1:2r + C1:2, D1:2;<br>Y = Bq:2r, A1:2r, C1:2 + D1:2. |
| Position 34: | X = B1r + A1r + C1r, D1r;<br>Y = B1r, A1r, C1r + D1r. |
| Position 35: | X = B1r + A1r + C1r, D1;<br>Y = B1r, A1r, C1r + D1. |
| Position 36: | X = B1r + A1r + C1, D1r;<br>Y = B1r, A1r, C1 + D1r. |
| Position 37: | X = B1r + A1r + D1 + C1;<br>Y = B1r, A1r, D1, C1. |
| Position 38: | X = B1:2 + A1r + D1 + C1r;<br>Y = B1r, A1r, D1, C1r. |
| Position 39: | X = B1r + A1r + D1r + C1;<br>Y = B1r, A1r, D1r, C1. |
| Position 40: | X = B1:2r + A1:2r + D1:2r + C1:2r;<br>Y = B1:2r, A1;2r, D1:2r, C1:2r. |
| Position 41: | X = B1r, D1 + A1r, C1;<br>Y = B1r, A1r, + D1, C1. |
| Position 42: | X = B1r, D1r + A1r, C1;<br>Y = B1r, A1r + D1r, C1. |
| Position 43: | X = B1:2r, D1:2r + A1:2r, C1:2r;<br>Y = B1:2r, A1:2r + D1:2r, C1:2r. |
| Position 44: | X = B1r, D1 + A1r, C;<br>Y = B1r, A1r + D1, C1r. |
| Position 45: | X = B1:2r + A1:2r, C1:2, D1:2;<br>Y = B1:2r, A1:2r + C1:2 + D1:2. |
| Position 46: | X = B1r + A1r, C1r, D1;<br>Y = B1r, A1r + C1r + D1. |
| Position 47: | X = B1r + A1r, C1, D1r;<br>Y = B1r, A1r + C1 + D1r. |
| Position 48: | X = B1r + A1r, C1r D1r;<br>Y = B1r, A1r + C1r + D1r. |
| Position 49: | X = A1r, B1r, C1 + D1;<br>Y = A1r + B1r, D1 + C1. |
| Position 50: | X = A1r, B1r, C1r + D1;<br>Y = A1r + B1r, D1 + C1r. |
| Position 51: | X = A1r, B1r, C1 + D1r;<br>Y = A1r + B1r, D1r + C1. |
| Position 52: | X = A1r, B1r, C1r + D1r;<br>Y = A1r + B1r, D1r + C1r. |
| Position 53: | X = A1r, B1r, D1 + C1;<br>Y = A1r + B1r, C1 + D1. |
| Position 54: | X = A1r, B1r, D1r + C1;<br>Y = A1r + B1r, C1 + D1r. |
| Position 55: | X = A1r, B1r, D1 + C1r;<br>Y = A1r + B1r, C1r + D1. |
| Position 56: | X = A1r, B1r D1r + C1r;<br>Y = A1r + B1r, C1r + D1r. |
| Position 57: | X = A1:2r, B1:2r + C1:2, D1:2;<br>Y = A1:2r, C1:2 + B1:2r + D1:2. |
| Position 58: | X = A1r, B1r + C1r, D1r;<br>Y = A1r, C1r + B1r, D1r. |
| Position 59: | X = A1r, B1r + C1r, D1;<br>Y = A1r, C1r + B1r D1. |
| Position 60: | X = A1r, B1r + C1, D1r;<br>Y = A1r, C1 + B1r, D1r. |
| Position 61: | X = A1r, B1r + D1 + C1; |
| Position 62: | Y = A1r, B1r, D1, C1.<br>X = A1r, B1r + D1 + C1r:<br>Y = A1r + B1r, D1, C1r. |
| Position 63: | X = A1r, B1r + D1r + C1;<br>Y = A1r + B1r, D1r, C1. |
| Position 64: | X = A1r, B1r + D1r + C1r;<br>Y = A1r + B1r, D1r, C1r. |
| Position 65: | X = A1r, B1r, D1 + C1;<br>Y = A1r + B1r + D1, C1 |
| Position 66: | X = A1r, B1r, D1r + C1;<br>Y = A1r + B1r + D1r, C1. |
| Position 67: | X = A1:2r, B1:2r, D1:2r, C1:2r;<br>Y = A1:2r + B1:2r + D1:2r, C1:2r. |
| Position 68: | X = A1r, B1r, D1 + C1r;<br>Y = A1r + B1r + D1, C1r. |
| Position 69: | X = A1:2r, B1:2r, C1:2, D1:2;<br>Y = A1:2r + B1:2r + C1:2 + D1:2. |
| Position 70: | X = A1r, B1r, C1r, D1;<br>Y = A1r + B1r + C1r + D1. |
| Position 71: | X = A1r, B1r, C1, D1r;<br>Y = A1r + B1r + C1 + D1r. |
| Position 72: | X = A1r, B1r, C1r, D1r;<br>Y = A1r + B1r + C1r + D1r. |
| Position 73: | X = A1 + B1, C1 + D1;<br>Y = A1, B1, D1 + C1. |
| Position 74: | X = A1 + B1, C1r + D1;<br>Y = A1, B1, D1 + C1r. |
| Position 75: | X = A1 + B1, C1 + D1r;<br>Y = A1, B1, D1r + C1. |
| Position 76: | X = A1, C1r + B1 + D1r;<br>Y = A1, B1, D1r + C1r. |
| Position 77: | X = A1 + B1, D1 + C1;<br>Y = A1, B1, C1 +0 D1. |
| Position 78: | X = A1 + B1, D1r + C1;<br>Y = A1, B1, C1 + D1r. |
| Position 79: | X = A1 + B1, D1 + C1r;<br>Y = A1, B1, C1r + D1. |
| Position 80: | X = A1 + b1, D1r + C1r;<br>Y = A1, B1, C1r + D1r. |
| Position 81: | X = A1 + B1:2 + C1:2, D1:2;<br>Y = A1:2, B1:2, C1:2 + D1:2. |
| Position 82: | X = A1 + B1 + C1r, D1r;<br>Y = A1, B1, C1r + D1r. |
| Position 83: | X = A1 + B1 + C1r, D1;<br>Y = A1, B1, C1r + D1. |
| Position 84: | X = A1 + B1 + C1, D1r;<br>Y = A1, B1, C1 + D1r. |
| Position 85: | X = A1 + B1 + D1 + C1;<br>Y = A1, B1, D1, C1. |
| Position 86: | X = A1 + B1 + D1 + C1r;<br>Y = A1, B1, D1, C1r. |
| Position 87: | X = A1 + B1 + D1r + C1;<br>Y = A1, B1, D1r, C1. |
| Position 88 | X = A1:2 + B1:2 + D1:2r + C1:2r;<br>Y = A1:2, B1:2, D1:2r, C1:2r. |
| Position 89: | X = A1, D1 + B1, C1;<br>Y = A1, B1 + D1, C1. |
| Position 90: | X = A1, D1r + B1, C1;<br>Y = A1, B1 + D1r, C1. |
| Position 91: | X = A1:2, D1:2r + B1:2, C1:2r;<br>Y = A1:2, B1:2 + D1:2r, C1:2r. |
| Position 92: | X = A1, D1 + B1, C1r;<br>Y = A1, B1 + D1, C1r. |
| Position 93: | X = A1:2, C1:2, D1:2 + B1:2;<br>Y = A1:2, B1:2 + C1:2 + D1:2. |
| Position 94: | X = A1, C1r, D1 + B1;<br>Y = A1, B1 + C1r + D1. |
| Position 95: | X = A1, C1, D1r + B1;<br>Y = A1, B1 + C1 + D1r. |
| Position 96: | X = A1 + B1, C1r, D1r;<br>Y = A1, B1 + C1r + D1r. |

18. The method as claimed in claim 17 wherein the letter E represents patterns E which are larger in a least one dimension than the laminar material and in which the following additional positions are calculated and compared:

| Position 97: | X = E1, E1 + C1, D1; |
|---|---|

|              |                                    |
|--------------|------------------------------------|
|              | Y = E1, C1 + E1, D1.              |
| Position 98: | X = E1, E1 + Clr, D1r;            |
|              | Y = E1, Clr + E1, D1r.            |
| Position 99: | X = E1, E1 + C1, D1r;             |
|              | Y = E1, C1 + E1, D1r.             |
| Position 100:| X = E1, E1 + Clr, D1;             |
|              | Y = E1, Clr + E1, D1.             |
| Position 101:| X = E1:2, E1:2, C1:2, D1:2;       |
|              | Y = E1:2 + E1:2 + C1:2 + D1:2.    |
| Position 102:| X = E1, E1, Clr, D1;              |
|              | Y = E1 + E1 + Clr + D1;           |
| Position 103:| X = E1, E1 Clr, D1r;              |
|              | Y = E1 + E1 + Clr + D1r.          |
| Position 104:| X = E1, E1, C1, D1r;              |
|              | Y = E1 + E1 + C1 + D1r.           |

19. The method as claimed in claim 1 wherein the step of converting the mathematical patterns into physical form onto a sheet of planar material includes converting said mathematical information to a form adapted to actuate an X-Y plotter and driving said X-Y plotter to reproduce said information.

20. The method as claimed in claim 19 further including the steps of cutting out the patterns plotted by said X-Y plotter.

21. The method as claimed in claim 20 wherein said cutting out step is by means of a laser beam carried by said X-Y plotter.

22. A method of automatically producing laminar patterns which comprise the closed, interrelated sides of a three dimensional product, by the control of a mechanically driven plotting apparatus to at least mark said patterns on a sheet of material positioned on a plotting bed of said plotting apparatus, said plotting apparatus including a plotting head supported for independent movement parallel to the plotting bed along mutually perpendicular X and Y axes, said plotting head being driven selectively along the respective X and Y axes under the control of computer means, the method including the steps of:
A. Storing in a memory of said computer means information representative of basic types of the three dimensional product and related, two dimensional pattern types required for the construction of the laminar patterns comprising the closed sides of the product, each said two dimensional pattern type having a specified geometry and at least one mathematical relationship relating basic actual dimensions of the product to the specified geometry, substantially all variations of the product being developable from said two dimensional pattern types, said basic dimensions comprising the size of the open sides of the product and at least one dimension determining the spatial relationship of the open sides;
B. Sequentially providing information to said computer means of said basic dimensions of the product;
C. Computing with said computer means the dimensions of the laminar patterns of each of the closed sides of the product;
D. Sequentially rotating and positionally orienting the dimensional representations of the developed patterns stored in said computer means without operator interaction and decision making to determine that orientation of the patterns which results in the smallest required surface area of at least a portion of a sheet of material of stock dimensions; and
E. Employing the data developed and stored in said computer means to mark out physical representations of said patterns on said sheet of material by the selective traversing of said plotting head along said X and Y axes.

23. The method as claimed in claim 22 in which said sequential rotation and positional orientation of the dimensional representations stored in said computer means of each said pattern, identified as A, B, C and D respectively is in the progression as follows, in which "X" indicates the positioning of the forms in one direction along the X-axis, and "Y" indicates the positioning of the forms along the Y-axis, the suffix "r" indicating the rotation of that particular form through 90 degrees, the suffix "1" indicating that the forms are tried in a single position, and the suffix "1:2" indicating that the forms are first tried in one position and then retried in mirror image and inverted mirror image:

|              |                                    |
|--------------|------------------------------------|
| Position 1:  | X = A1, B1, C1;                   |
|              | Y = B1, D1.                       |
| Position 2:  | X = A1, B1, Clr;                  |
|              | Y = B1, D1                        |
| Position 3:  | X = A1, B1, C1;                   |
|              | Y = B1, D1r.                      |
| Position 4:  | X = A1, B1, Clr;                  |
|              | Y = B1, D1r.                      |
| Position 5:  | X = A1, B1, D1;                   |
|              | Y = B1, C1.                       |
| Position 6:  | X = A1, B1, D1r;                  |
|              | Y = B1, C1.                       |
| Position 7:  | X = A1, B1, D1;                   |
|              | Y = B1, Clr.                      |
| Position 8:  | X = A1, B1, D1r;                  |
|              | Y = B1, Clr.                      |
| Position 9:  | X = A1:2, B1:2 + C1:2, D1:2;      |
|              | Y = A1:2, C1:2 + B1:2, D1:2.      |
| Position 10: | X = A1, B1 + Clr, D1r;            |
|              | Y = A1, Clr + B1, D1r.            |
| Position 11: | X = A1, B1 + Clr, D1;             |
|              | Y = A1,d Clr + B1, D1.            |
| Position 12: | X = A1, B1 + C1, D1r;             |
|              | Y = A1, C1 + B1, D1r.             |
| Position 13: | X = A1, B1 + D1 + C1;             |
|              | Y = A1 + B1, D1, C1.              |
| Position 14: | X = A1, B1 + D1 +Clr;             |
|              | Y = A1 + B1, D1, Clr.             |
| Position 15: | X = A1, B1 + D1r + C1;            |
|              | Y = A1 + B1, D1r, C1.             |
| Position 16: | X = A1:2, B1:2 + D1:2 + C1:2r;    |
|              | Y = A1:2 + B1:2, D1:2r, C1:2r.    |
| Position 17: | X = A1, B1, D1 & C1;              |
|              | Y = A1 + B1 + D1, C1.             |
| Position 18: | X = A1, B1, D1r & C1;             |
|              | Y = A1 + B1 +D1r, C1.             |
| Position 19: | X = A1, B1, D1r + Clr             |
|              | Y = A1 + B1 + D1r, Clr.           |
| Position 20: | X = A1, B1, D1 + Clr;             |
|              | Y = A1 + B1 + D1, Clr.            |
| Position 21: | X = A1:2, B1:2, C1:2, D1:2;       |
|              | Y = A1:2 + B1:2 + C1:2 + D1:2.    |
| Position 22: | X = A1, B1, C1R, D1;              |
|              | Y = A1 + B1 + C1R + D1.           |
| Position 23: | X = A1, B1, C1, D1r;              |
|              | Y = A1 + B1 + C1 + D1r.           |
| Position 24: | X = A1, B1, Clr, D1r;             |
|              | Y = A1 + B1 + Clr + D1r.          |
| Position 25: | X = B1r + A1r, C1 + D1;           |
|              | Y = B1r, A1r, D1 + C.             |
| Position 26: | X = B1r + A1r, Clr + D1;          |
|              | Y = B1r, A1r, D1 + Clr.           |
| Position 27: | X = B1r + A1r, C1 + D1r;          |
|              | Y = B1r, A1r, D1r + C1.           |
| Position 28: | X = B1r, A1r, Clr + D1r;          |
|              | Y = B1r, A1r, D1r + Clr.          |
| Position 29: | X = B1r + A1r, D1 + C1;           |

-continued

| | |
|---|---|
| Position 30: | X = B1r + A1r, D1r, C1;<br>Y = B1r, A1r, C1 + D1. |
| | Y = B1r, A1r, C1 + D1r. |
| Position 31: | X = B1r + A1r, D1 + C1r;<br>Y = B1r, A1r, C1r + D1. |
| Position 32: | X = B1r + A1r, D1r + C1r;<br>Y = B1r, A1r, C1r + D1r. |
| Position 33: | X = B1:2r + A1:2r + C1:2, D1:2;<br>Y = Bq:2r, A1:2r, C1:2 + D1:2. |
| Position 34: | X = B1r + A1r + C1r, D1r;<br>Y = B1r, A1r, C1r + D1r. |
| Position 35: | X = B1r + A1r + C1r, D1;<br>Y = B1r, A1r, C1r + D1. |
| Position 36: | X = B1r + A1r + C1, D1r;<br>Y = B1r, A1r, C1 + D1r. |
| Position 37: | X = B1r + A1r + D1 + C1;<br>Y = B1r, A1r, D1, C1. |
| Position 38: | X = B1r + A1r + D1 + C1r;<br>Y = B1r, A1r, D1, C1r. |
| Position 39: | X = B1r + A1r + D1r + C1;<br>Y = B1r, A1r, D1r, C1. |
| Position 40: | X = B1:2r + A1:2r + D1:2r + C1:2r;<br>Y = B1:2r, A1:2r, D1:2r, C1:2r. |
| Position 41: | X = B1r, D1 + A1r, C1;<br>Y = B1r, A1r + D1, C1. |
| Position 42: | X = B1r, D1r + A1r, C1;<br>Y = B1r, A1r + D1r, C1. |
| Position 43: | X = B1:2r, D1:2r + A1:2r, C1:2r;<br>Y = B1:2r, A1:2r + D1:2r, C1:2r. |
| Position 44: | X = B1r, D1 + A1r, C;<br>Y = B1r, A1r + D1, C1r. |
| Position 45: | X = B1:2r + A1:2r, C1:2, D1:2;<br>Y = B1:2r, A1:2r + C1:2 + D1:2. |
| Position 46: | X = B1r + A1r, C1r, D1;<br>Y = B1r, A1r + C1r + D1. |
| Position 47: | X = B1r + A1r, C1, D1r;<br>Y = B1r, A1r + C1 + D1r. |
| Position 48: | X = B1r + A1r, C1r, D1r;<br>Y = B1r, A1r + C1r + D1r. |
| Position 49: | X = A1r, B1r, C1 + D1;<br>Y = A1r + B1r, D1 + C1. |
| Position 50: | X = A1r, B1r, C1r + D1;<br>Y = A1r + B1r, D1 + C1r. |
| Position 51: | X = A1r, B1r, C1 + D1r,<br>Y = A1r + B1r,D1r + C1. |
| Position 52: | X = A1r, B1r, C1r + D1r;<br>Y = A1r + B1r, D1r + C1. |
| Position 53: | X = A1r, B1r, D1 + C1;<br>Y = A1r + B1r, C1 + D1. |
| Position 54: | X = A1r, B1r, D1r + C1;<br>Y = A1r + B1r, C1 + D1r. |
| Position 55: | X = A1r, B1r, D1 + C1r;<br>Y = A1r + B1r, C1r + D1. |
| Position 56: | X = A1r, B1r, D1r + C1r;<br>Y = A1r + B1r, C1r + D1r. |
| Position 57: | X = A1:2r, B1:2r + C1:2, D1:2;<br>Y = A1:2r, C1:2 + B1:2r, D1:2. |
| Position 58: | X = A1r, B1r + C1r, D1r;<br>Y = A1r, C1r + B1r, D1r. |
| Position 59: | X = A1r, B1r + C1r, D1;<br>Y = A1r, C1r + B1r, D1. |
| Position 60: | X = A1r, B1r + C1, D1r;<br>Y = A1r, C1 + B1r, D1r. |
| Position 61: | X = A1r, B1r + D1 + C1;<br>Y = A1r, B1r, D1, C1. |
| Position 62: | X = A1r, B1r + D1 + C1r;<br>Y = A1r + B1r, D1, C1r. |
| Position 63: | X = A1r, B1r + D1r + C1;<br>Y = A1r + B1r, D1r, C1. |
| Position 64: | X = A1r, B1r + D1r + C1r;<br>Y = A1r + B1r, D1r, C1r. |
| Position 65: | X = A1r, B1r, D1 + C1;<br>Y = A1r + B1r + D1, C1 |
| Position 66: | X = A1r, B1r, D1r + C1;<br>Y = A1r + B1r + D1r, C1. |
| Position 67: | X = A1:2r, B1:2r, D1:2r, C1:2r;<br>Y = A1:2r + B1:2r + D1:2r, C1:2r. |
| Position 68: | X = A1r, B1r, D1 + C1r;<br>Y = A1r + B1r + D1, C1r. |
| Position 69: | X = A1:2r, B1:2r, C1:2, D1:2;<br>Y = A1:2r + B1:2r C1:2 + D1:2. |

-continued

| | |
|---|---|
| Position 70: | X = A1r, B1r, C1r, D1;<br>Y = A1r + B1r + C1r + D1. |
| Position 71: | X = A1r, B1r, C1, D1r;<br>Y = A1r + B1r + C1 + D1r. |
| Position 72: | X = A1r, B1r, C1r, D1r;<br>Y = A1r + B1r + C1r + D1r. |
| Position 73: | X = A1 + B1, C1 + D1;<br>Y = A1, B1, D1 + C1. |
| Position 74: | X = A1 + B1, C1r + D1;<br>Y = A1, B1, D1 + C1r. |
| Position 75: | X = A1 + B1, C1 + D1r;<br>Y = A1, B1, D1r + C1. |
| Position 76: | X = A1, C1r + B1 + D1r;<br>Y = A1, B1, D1r + C1r. |
| Position 77: | X = A1 + B1, D1 + C1;<br>Y = A1, B1, C1 + D1. |
| Position 78: | X = A1 + B1, D1r + C1;<br>Y = A1, B1, C1 + D1r. |
| Positoin 79: | X = A1 + B1, D1 + C1r,;<br>Y = A1, B1, C1r + D1. |
| Position 80: | X = A1 + b1, D1r + C1r;<br>Y = A1, B1, C1r + D1r. |
| Position 81: | X = A1:2 + B1:2 + C1:2, D1:2;<br>Y = A1:2, B1:2, C1:2 + D1:2. |
| Position 82: | X = A1 + B1 + C1r, D1r;<br>Y = A1, B1, C1r + D1r. |
| Position 83: | X = A1 + B1 + C1r, D1;<br>Y = A1, B1, C1r + D1. |
| Position 84: | X = A1 + B1 + C1, D1r;<br>Y = A1, B1, C1 + D1r. |
| Position 85: | X = A1 + B1 + D1 + C1;<br>Y = A1, B1, D1, C1. |
| Position 86: | X = A1 + B1 + D1 + C1r;<br>Y = A1, B1, D1, C1r. |
| Position 87: | X = A1 + B1 + D1r + C1;<br>Y = A1, B1, D1r, C1. |
| Position 88: | X = A1:2 + B1:2 + D1:2r + C1:2r;<br>Y = A1:2, B1:2, D1:2, C1:2r. |
| Position 89: | X = A1, D1 + B1, C1;<br>Y = A1, B1 + D1, C1. |
| Position 90: | X = A1, D1r + B1, C1;<br>Y = A1, B1 + D1r, C1. |
| Position 91: | X = A1:2, D1:2r + B1:2, C1:2r;<br>Y = A1:2 + D1:2r + B1:2, C1:2r. |
| Position 92: | X = A1, D1 + B1, C1r;<br>Y = A1, B1 + D1, C1r. |
| Position 93: | X = A1:2, C1:2, D1:2 + B1:2;<br>Y = A1:2, B1:2 + C1:2 + D1:2. |
| Position 94: | X = A1, C1r, D1 + B1;<br>Y = A1, B1 + C1r + D1. |
| Position 95: | X = A1, C1, D1r + B1;<br>Y = A1, B1 + C1 + D1r. |
| Position 96: | X = A1 + B1, C1r, D1r;<br>Y = A1, B1 + C1r + D1r. |

24. The method as claimed in claim 23 wherein E indicates the dimensional representation stored in said computer means of a pattern which in one dimension is greater than that of the sheet material, further including the additional positional comparisons;

| | |
|---|---|
| Position 97: | X = E1, E1 + C1, D1;<br>Y = E1, C1 + E1, D1. |
| Position 98: | X = E1, E1 + C1r, D1r;<br>Y = E1, C1r + E1, D1r. |
| Position 99: | X = E1, E1 + C1, D1r;<br>Y = E1, C1 + E1, D1r. |
| Position 100: | X = E1, E1 + C1r, D1;<br>Y = E1, C1r + E1, D1. |
| Position 101: | X = E1:2, E1:2, C1:2, D1:2;<br>Y = E1:2 + E1:2 + C1:2 + D1:2. |
| Position 102: | X = E1, E1, C1r, D1;<br>Y = E1 + E1 + C1r + D1; |
| Position 103: | X = E1, E1 C1r, D1r;<br>Y = E1 + E1 + C1r + D1r. |
| Position 104: | X = E1, E1, C1, D1r; |

-continued $$Y = E1 + E1 + C1 + D1r.$$

25. Apparatus for creating a pattern for a three-dimensional product which can be fabricated from patterns of laminar sheet material including:
   a. means for electronically creating through mathematical calculation the pattern of a selected portion of the end product on the basis of dimensional information;
   b. means for electronically creating through mathematical calculation the other of the patterns of the end product;
   c. means for positioning all the patterns required for such end product in a grouping such that the grouping when aligned on a sheet material may be severed from the sheet material by a single substantially straight cut across the sheet material;
   d. means for positioning selected pairs of patterns in said group with like edge configurations into relative juxtaposition;
   e. means for comparing said pairs of patterns to yield a juxtaposition which provides for optimum material usage and severance of the patterns with a minimum of cutting steps; and
   f. means for converting the pattern into physical form onto a sheet of planar material.

26. The apparatus as claimed in claim 25 wherein said three-dimensional product is a generally rectilinear duct fitting.

27. The apparatus as claimed in claim 26 wherein said pattern is selected from a group of patterns which can be developed from one or more of the following:
   a. an annular segment of a circle;
   b. dual interconnected annular segments of circles taken about centers of generation which are spaced from each other; and
   c. a planar rectangular figure.

28. Apparatus as claimed in claim 25 wherein said electronic means is a microprocessor.

29. Apparatus as claimed in claim 25 wherein said converting means is an X-Y plotter.

30. Apparatus as claimed in claim 25 further including means to sever said patterns from said sheet of planar material.

31. Apparatus as claimed in claim 30 wherein said severing means is a laser.

32. A method for producing the customized patterns of the closed sides of a three dimensional product which can be fabricated from sheet material, such as a ventilating duct fitting, comprising the steps of:
   storing in memory means, information representative of the configurations of a group of basic types of the three dimensional product and two dimensional pattern types required for the construction of the closed sides of the product, each such pattern type having a specified geometry and at least one mathematical relationship relating selected basic dimensions of the product to the specified geometry, substantially all variations of the product being developable from said basic pattern types, said basic dimensions comprising the size of the open sides of the product and at least one dimension determining the spatial relationship of the open sides;
   entering input data including the type of the three dimensional product and said basic dimensions;
   generating, without operator interaction and decision-making, from said basic dimensional data and three dimensional product type data, the pattern of each of the closed sides of the product, each of said patterns developed from selected ones of said basic pattern types in response to said input dimensional and product type data;
   positioning each developed pattern in related positions with other developed patterns to generate a series of positionings without operator interaction and decision-making;
   determining which of said positionings yields a minimum surface area so as to provide for optimum material usage without operator interaction and decision-making and generating digital data representing said optimum positioning;
   supplying the digital data representing said optimum positioning to an X-Y plotting table, said data including digital data representing the starting point for each pattern in X-Y format and sequential digital data in X-Y format representing the contour of each pattern; and
   plotting said patterns in accordance with said digital data on a sheet of material on said plotting table.

33. The method recited in claim 32 wherein said step of storing comprises storing in a digital memory the digitized representations of a planar annular segment of a circle, two interconnected planar annular segments of circles taken about centers of generation which are spaced from each other and a planar figure having substantially straight sides.

34. The method recited in claim 32 wherein said steps of positioning and determining comprises arranging said developed patterns in proximity to each other in accordance with a computer program stored in said memory means, said developed patterns being arranged with edges having like contours in adjacent relationship.

35. The method recited in claim 32 wherein said step of supplying comprises the steps of:
   transmitting the digital data representing said optimum positioning to means for generating a physical representation of said digital data on an information bearing medium;
   generating said physical representation on said medium; and
   electronically reading said digital data from said medium and transmitting said digital data to said X-Y plotting table.

36. The method recited in claim 32 wherein said step of plotting further comprises cutting said patterns from said sheet of material on said plotting table.

37. Apparatus for producing the customized patterns of the closed sides of a three dimensional product which can be fabricated from sheet material, such as a ventilating duct fitting, comprising:
   memory means for storing information representative of the configurations of a group of basic types of the three dimensional product and two dimensional pattern types required for the construction of the closed sides of the product, each such pattern type having a specified geometry and at least one mathematical relationship relating selected basic dimensions of the product to the specified geometry, substantially all variations of the product being developable from said basic pattern types, said basic dimensions comprising the size of the open sides of the product and at least one dimension determining the spatial relationship of the open sides;

means for entering input data including the type of the three dimensional product and said basic dimensions;

means for generating, without operator interaction and decision making, from said basic dimensional data and three dimensional product type data, the pattern of each of the closed sides of the product, each of said patterns developed from selected ones of said basic pattern types in response to said input dimensional and product type data;

means for positioning each developed pattern in related positions with other developed patterns to generate a series of positionings without operator interaction and decision-making;

means for determining which of said positionings yields a minimum surface area so as to provide for optimum material usage without operator interaction and decision-making and means for generating digital data representing said optimum positioning;

means for supplying the digital data representing said optimum positioning to an X-Y plotting table, said data including digital data representing the starting point for each pattern in X-Y format and sequential digital data in X-Y format representing the contour of each pattern; and means for plotting said patterns in accordance with said digital data on a sheet of material on said plotting table.

38. The apparatus recited in claim 37 wherein said memory means comprises digital memory means for storing the digitized representations of a planar annular segment of a circle, two interconnected planar annular segments of circles taken about centers of generation which are spaced from each other and a planar figure having substantially straight sides.

39. The apparatus recited in claim 37 wherein said means for positioning and said means for determining comprises means for arranging said developed patterns in proximity to each other in accordance with a computer program stored in said memory means, said developed patterns being arranged with edges having like contours in adjacent relationship.

40. The apparatus recited in claim 37 wherein said means for supplying comprises:
means for transmitting the digital data representing said optimum positioning to means for generating a physical representation of said digital data on an information bearing medium;
means for generating said physical representation on said medium; and
means for electronically reading said digital data from said medium and transmitting said digital data to said X-Y plotting table.

41. The apparatus recited in claim 37 wherein said means for plotting further comprises means for cutting said patterns from said sheet of material on said plotting table.

42. A method for producing the customized patterns of the closed sides of a three-dimensional product which can be fabricated from sheet material, such as a ventilating duct fitting, comprising the steps of:
storing information representative of the configurations of a group of basic types of the three dimensional product and two dimensional pattern types required for the construction of the closed sides of the product, each such pattern type having a specified geometry and at least one mathematical relationship relating selected basic dimensions of the product to the specified geometry, substantially all variations of the product being developable from said basic pattern types, said basic dimensions comprising the size of the open sides of the product and at least one dimension determining the spatial relationship of the open sides;

entering input data including said basic dimensions and data associated with a selection of a two-dimensional pattern type associated with the product;

generating, without operator interaction and decision-making, from said basic dimensions and data associated with the two-dimensional pattern type, the pattern of each of the closed sides of the product, each of said patterns developed from selected ones of said basic pattern types in response to said basic dimensions and data associated with the pattern type;

positioning each developed pattern in related positions with other developed patterns to generate a series of positionings without operator interaction and decision-making;

determining which of said positionings yields a minimum surface area so as to provide for optimum material usage without operator interaction and decision-making and generating digital data representing said optimum positioning;

supplying the digital data representing said optimum positioning to a plotting table; and plotting said patterns in accordance with said digital data on a sheet of material on said plotting table.

43. The method recited in claim 42, wherein said step of storing comprises storing the digitized representations of a planar annular segment of a circle, two interconnected planar annular segments of circles taken about centers of generation which are spaced from each other and a planar figure having substantially straight sides.

44. The method recited in claim 42, wherein said steps of positioning and determining comprises arranging said developed patterns in proximity to each other in accordance with a computer program, said developed patterns being arranged with edges having like contours in adjacent relationship.

45. The method recited in claim 42, wherein said step of supplying comprises the steps of:
transmitting the digital data representing the optimum positioning to means for generating a physical representation of said digital data on an information bearing medium;
generating said physical representation on said medium; and
electronically reading said digital data from said medium and transmitting said digital data to said plotting table.

46. The method recited in claim 42, wherein said step of plotting further comprises cutting said patterns from said sheet of material on said plotting table.

47. Apparatus for producing the customized patterns of the closed sides of a three-dimensional product which can be fabricated from sheet material, such as a ventilating duct fitting, comprising:
memory means for storing information representative of the configurations of a group of basic types of the three dimensional product and two-dimensional pattern types required for the construction of the closed sides of the product, each such pattern type having a specified geometry and at least one mathematical relationship relating selected basic dimensions of the product to the specified geometry, substantially all variations of the product being developable from said basic pattern types, said basic dimensions comprising the size of the open sides of the product and at least one dimension determining the spatial relationship of the open sides;

means for entering input data including said basic dimensions and data associated with a selection of a two-dimensional pattern type associated with the product;

means for generating, without operator interaction and decision-making, from said basic dimensions and data associated with the two-dimensional pattern type, the pattern of each of the closed sides of the product, each of said patterns developed from selected ones of said basic pattern types in response to said basic dimensions and data associated with the pattern type;

means for positioning each developed pattern in related positions with other developed patterns to generate a series of positionings without operator interaction and decision-making;

means for determining which of said positionings yields a minimum surface area so as to provide for optimum material usage without operator interaction and decision-making and means for generating digital data representing said optimum positioning;

means for supplying the digital data representing said optimum positioning to a plotting table; and means for plotting said patterns in accordance with said digital data on a sheet of material on said plotting table.

48. The apparatus recited in claim 47, wherein said memory means comprises digital memory means for storing the digitized representations of a planar annular segment of a circle, two interconnected planar annular segments of circles taken about centers of generation which are spaced from each other and a planar figure having substantially straight sides.

49. The apparatus recited in claim 47, wherein said means for positioning and said means for determining comprises means for arranging said developed patterns in proximity to each other in accordance with a computer program stored in said memory means, said developed patterns being arranged with edges having like contours in adjacent relationship.

50. The apparatus recited in claim 47, wherein said means for supplying comprises:

means for transmitting the digital data representing said optimum positioning to means for generating a physical representation of said digital data on an information bearing medium;

means for generating said physical representation on said medium; and means for electronically reading said digital data from said medium and transmitting said digital data to said plotting table.

51. The apparatus recited in claim 47, wherein said means for plotting further comprises means for cutting said patterns from said sheet of material on said plotting table.

* * * * *

UNITED STATES PATENT AND TRADEMARK OFFICE
CERTIFICATE OF CORRECTION

PATENT NO.   : 4,554,635

DATED        : November 19, 1985

INVENTOR(S)  : Richard W. Levine

It is certified that error appears in the above-identified patent and that said Letters Patent is hereby corrected as shown below:

```
Col.  7, line 13, change "algorithm" to --algorithms--.
Col.  7, lines 18, 19, change "posi-tions" to --posi-tion--.
Col.  7, Position 10:  change "Clr. Dlr;" to --Clr, Dlr;--.
Col.  7, Position 17:  change "Dl & Cl;" to --Dl + Cl;--.
Col.  7, Position 18:  change "Dlr & Cl'" t0 --Dlr + Cl;--.
Col.  8, Position 45:  delete "I" after "+".
Col. 12, line 18, delete "to" and insert --be--.
Col. 14, line 51, delete "as" and insert --or--.
Col. 16, line 24, after "X'" insert --is--.
Col. 18, box C5 should read:
```

| A | 1 |
|---|---|
| B | 2 |
| C |   |
| D |   |

UNITED STATES PATENT AND TRADEMARK OFFICE
CERTIFICATE OF CORRECTION

PATENT NO. : 4,554,635

DATED : November 19, 1985

INVENTOR(S) : Richard W. Levine

It is certified that error appears in the above-identified patent and that said Letters Patent is hereby corrected as shown below:

Col. 20, box K8 should read:

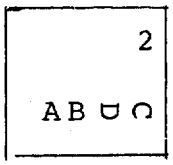

Col. 20, box L8 should read:

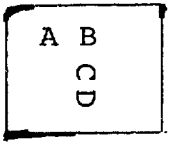

Col. 21, line 31, change "results" to --result--.

UNITED STATES PATENT AND TRADEMARK OFFICE
CERTIFICATE OF CORRECTION

PATENT NO. : 4,554,635

DATED : November 19, 1985

INVENTOR(S) : Richard W. Levine

It is certified that error appears in the above-identified patent and that said Letters Patent is hereby corrected as shown below:

Col. 21, line 67, after "invention" insert --is--.
Col. 22, line 42, change "if" to --of--.
Col. 24, line 3, change "28" to --208--.

In the Claims:

Col. 25, line 30, change "filling" to --fitting--.
Col. 25, line 41, delete "described" and insert --claimed--.
Col. 25, line 50, after "wherein" insert --said--.
Col. 25, line 57, change "connected" to --connect--.
Col. 27, line 25, after "solving" delete "the" and insert --for--
Col. 28, Position 11: after "Y = A1" delete "d".
Col. 28, Position 17: after "D1" delete "&" and insert --+--
Col. 28, Position 18: after "D1r" delete "&" and insert --+--.
Col. 28, line 1, after "MNO" insert --Sine angle--.
Col. 29, Position 33: after "Y = B" delete "q" and insert --1--.
Col. 29, Position 48: after "A1r, C1r", insert --,--.
Col. 30, Position 77: after "C1 +", delete "0".
Col. 30, Position 80: after "A1 +" delete "b" and insert --B--.
Col. 31, Position 103: after "E1" and before "C1r" insert --,--.
Col. 32, Position 11: after "A1," and before "C1r", delete "d".

UNITED STATES PATENT AND TRADEMARK OFFICE
CERTIFICATE OF CORRECTION

PATENT NO. : 4,554,635

DATED : November 19, 1985

INVENTOR(S) : Richard W. Levine

It is certified that error appears in the above-identified patent and that said Letters Patent is hereby corrected as shown below:

```
Col. 32, Position  16: after "D1:2" and before "+" insert --r--
Col. 32, Position  17: after "B1, D1" delete "&" and insert --+--
Col. 32, Position  18: after "B1, D1r" delete "&" and insert --+--
Col. 32, Position  22: both occurrences delete "R", insert --r--.
Col. 33, Position  33: after "Y = B" delete "q", insert --1--.
Col. 33, Position  69: after "Y = A1:2r + B1:2r" insert --+--.
Col. 34, Position  80: after "X = A1 +" delete "b", insert --B--.
Col. 34, Position  88: after "B1:2, D1:2" insert --r--.
Col. 34, Position 102: after "D1" delete ";" and insert --.--,
                        second occurrence.
```

Signed and Sealed this

Ninth Day of December, 1986

*Attest:*

DONALD J. QUIGG

*Attesting Officer*    *Commissioner of Patents and Trademarks*

REEXAMINATION CERTIFICATE (2687th)
United States Patent [19]
Levine

[11] B1 4,554,635
[45] Certificate Issued  * Oct. 3, 1995

[54] METHOD AND APPARATUS FOR MARKING OR CUTTING LAMINAR PATTERNS OR FORMS

[75] Inventor: Richard W. Levine, Dobbs Ferry, N.Y.

[73] Assignee: Construction Technology, Inc., Elmsford, N.Y.

Reexamination Request
No. 90/003,026, Apr. 12, 1993
No. 90/003,303, Jan. 12, 1994

Reexamination Certificate for:
Patent No.: 4,554,635
Issued: Nov. 19, 1985
Appl. No.: 503,699
Filed: Jun. 13, 1983

[*] Notice: The portion of the term of this patent subsequent to Nov. 5, 2002 has been disclaimed.
Certificate of Correction issued Dec. 9, 1986.

Related U.S. Application Data

[63] Continuation-in-part of Ser. No. 402,607, Jul. 28, 1982, abandoned.
[51] Int. Cl.$^6$ ................................. G06F 19/00
[52] U.S. Cl. .................. 364/474.25; 83/32; 83/75.5; 364/148; 364/474.05; 364/474.09; 364/474.13; 364/512; 364/191
[58] Field of Search ............ 364/468, 474.24, 364/474.09, 505, 506, 512, 148, 191, 192, 193, 474.02, 474.22–474.27; 83/32, 72–76, 76.1–76.9, 936

[56] References Cited

PUBLICATIONS

"Compuduct™: The Better Way", Construction Technology, Inc. (CTI) 1975 (Reexam Ex. C).
"Special Offer Duct Detailers Speed Kit" 1976 (Ex. M).
"Construction Technology, Inc.'s New Compuduct Auto–Plot Provides Layout of Sheet Metal Fitting in Three Minutes," Snips, Nov. 1980, p. 40 (Ex. E).
"Compuduct Auto–Plot Demonstration at ASHRAE–ARI Show Draws Record Crowds," Snips, Mar. 1981, pp. 40–41 (Ex. F).
"The Compuduct Auto–Plot™," Snips, Mar. 1981, p. 63 (Ex. G).
Quotation and Equipment Description from CTI to BHW Sheet Metal dated Jan. 29, 1981 (6 pages) (Ex. H).
Publicity release re the "Auto–Plot™ Extension to Compuduct" with three photographs of the system demonstrated at the 1981 ASHRAE Show (Ex. I).
"Computerized Plotting System Lays Out Sheet Metal Fittings Directly, Quickly, Economically," Air Conditioning, Heating and Refrigeration News Dec. 1, 1980, p. 14 (Ex. J).
Segroves, J. L., "Shop Data Systems, Inc. Duct Detailing and Fitting Blanking," Shop Data Systems, Inc. 1976 (Ex. K).
"Quickduct," Shop Data Systems, Inc. 1980 (Ex. L).
Griesheim, "OMNIDATA® INtelligent Coding System for Cutting Machines and other Tools," 33 pages (Ex. O); date unknown.
Schiffko GmbH, "Schiffko EVD System": Hamburg, Germany (w/English translation) (Ex. P); date unknown.
"Programm Übersicht Des Schiffko–Systems," Oct. 1976; Supplements as of Aug. 1977 (w/English translation) (Ex. Q); date unknown.
"Bauteile Abwicklung," (Construction Units Transaction) 11 pages (w/English translation) (Ex. R); date unknown.
Greisheim, OMNIDATA computer system, 8 pages (In Ex. S, attachment A); date unknown.
Greisheim, Rechnersystem OMINDATA (German), 8 pages (In Ex. S, attachment B); date unknown.
Greisheim, Ordinateur OMNIDATA (French), 8 pages (In Ex. S, attachment C); date unknown.
Greisheim, System komputerowy OMNIDATA (Russian) 8 pages (In Ex. S, attachment D); date unknown.
Greisheim, OMNIDATA Intelligent coding system for cutting machines and other machine tools, 32 pages (In Ex. S, attachment E); date unknown.
Greisheim, OMNIDATA Intelligentes Codiersystem für Schneid–und Werkzeugmaschinen (German), 31 pages (In Ex. S, attachment F); date unknown.
Greisheim, OMNIDATA System de programmation intelligent pour machines etc. (French), 31 pages (In Ex. S, attachment G); date unknown.

(List continued on next page.)

Primary Examiner—Joseph Ruggiero

[57] ABSTRACT

The present invention relates to a method and apparatus for creating, laying out and cutting patterns on laminar sheet material having particular application to air handling ducting which permits the fully automated creation of the patterns required to subsequently construct three-dimensional products such as fittings, which have heretofore only been designed by skilled technicians. Information representative of the geometric configurations of a group of basic pattern types, including mathematical relationships, is stored in digital form in a memory. From the basic pattern types, substantially all variations of the three-dimensional product can be developed. An operator specifies the type of fittng required and inputs selected actual basic dimensions of the product, the basic dimensions being those dimensions necessary to specify the overall dimensions of the product. The patterns for the closed sides of the product are developed from the mathematical relationships specifying the geometry of the basic pattern types in response to the input basic dimensions. The patterns so developed are then computed for optimum positioning with other developed patterns, most preferably with alignment of similarly shaped edges for sheet material optimization, and preferably with adjacent grouping of the patterns for each end product to facilitate location and assembly and, most preferably, in such a manner that each grouping can be severed from the sheet material with a single cut to facilitate use of sheet or coil stock shearing machinery.

PUBLICATIONS

Greisheim, OMNIDATA Sistema de codificacion inteligente para etc. (Spanish), 31 pages (In Ex. S, attachment H); date unknown.

Greisheim, OMNIDATA (as above in Russian), 31 pages (In Ex. S, attachment I); date unknown.

Greisheim, OMNIDATA (as above in Japanese), 31 pages (In Ex. S, attachment J); date unknown.

Greisheim, Components S 16, Software for the preparation for paper tapes for control purposes, 8 pp. (In Ex. S, attachment K); date unknown.

Greisheim, Components SMD, An established EDP package for the plate processing industry, 13, pages (In Ex. S, attachment L); date unknown.

Greisheim, Description of Program, (English and German), 19 pages (In Ex. S, attachment M); date unknown.

Greisheim, Instruction Manual (English and German), 9 pages (In Ex. S, attachment N); date unknown.

Greisheim, Instruction Manual VESUV Automatic Nesting and Management (English and German), 80 pages (In Ex. S, attachment O); date unknown.

Greisheim, Manual Components S 16 English Commands, 143 pages (In Ex. S, attachment P); date unknown.

Greisheim, Instruction Manual for D16 Digitising Unit with English commands, 17 pages (In Ex. S, attachment Q); date unknown.

Greisheim, Benutzer Hanbuch, Teilprogramm Phase 1/Geometrie (German), 128 pages (In Ex. S, attachment R); date unknown.

Schiffko EDV System, Bauteile-Abwicklung Modul Rohrkrümmer, 21 pages (In Ex. S, attachment S); date unknown.

Schiffko EDV System, Programm-Übersicht Des Schiffko-Systems, 7 pages (In Ex. S, attachment T); date unknown.

Schiffko EDV System, Bauteile-Abwicklung CD C 6600/CD C175, 3 pages (In Ex. S, attachment U); date unknown.

Greisheim, Annual Report 1979 (In Ex. S, attachment V).

Greisheim, Annual Report 1980 (In Ex. S, attachment W).

Greisheim, Annual Report 1981 (In Ex. S, attachment X).

"Scheissen und Schneiden"(Welding and Cutting), Year of Publication 31 (1979), Nr. 4, pp. 169 & 175 (with English Translation) (In Ex. S, attachment Y).

Hannover-Messe, Press Release, (1976) 20 pages (with English Translation) (In Ex. S, attachment Z).

Copy of cover, table of contents, and pp. 80–83 of "Welding Design & Fabrication" of Jun. 1979; particularly pp. 80–83 bearing article entitled Computerized Cutting Needs No Programmer (Reexam Ex. T, Adams Ex. A).

"Linde Division N/C Flame Cutter Technology—Precision Improved Nesting system User Guide, Mar., 1979" *PINS* (Reexam Ex. T, Adams Ex. C).

"Linde Division N/C Flame Cutter Technology—Adapt Macros for shape Cutting", Feb. 1980 (Adapt Manual) (Reexam Ex. T, Adams Ex. G).

Brochure of the McCarter Corporation entitled "Batch Type Asphalt Plants" (Reexam Ex. T, Adams Ex. I); date unknown.

Brochure of McCarter Corporation entitled "Baghouse Dust Collectors" (Reexam Ex. T, Adams Ex. J); date unknown.

"Introducing the Compuduct Autoplot™" Letter and News Release, Nov. 1980 (Reexam Ex. D).

"Why U.K. Duct Firms Are Installing Computers," *Sheet Metal Industries,* Aug., 1980, pp. 690–692 (Reexam Ex. N).

Numerical Engineering—The Key to Success, British Numerical Control Society, Mar. 31, 1981.

REEXAMINATION CERTIFICATE ISSUED UNDER 35 U.S.C. 307

NO AMENDMENTS HAVE BEEN MADE TO THE PATENT.

AS A RESULT OF REEXAMINATION, IT HAS BEEN DETERMINED THAT:

The patentability of claims 1-51 is confirmed.

\* \* \* \* \*